US008549261B2

(12) United States Patent
Inada

(10) Patent No.: US 8,549,261 B2
(45) Date of Patent: Oct. 1, 2013

(54) PARALLEL COMPUTING APPARATUS AND PARALLEL COMPUTING METHOD

(75) Inventor: Yoshie Inada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/459,360

(22) Filed: Apr. 30, 2012

(65) Prior Publication Data

US 2012/0216017 A1 Aug. 23, 2012

Related U.S. Application Data

(63) Continuation of application No. PCT/JP2009/069443, filed on Nov. 16, 2009.

(51) Int. Cl.
*G06F 9/46* (2006.01)
*G06F 15/16* (2006.01)

(52) U.S. Cl.
USPC .............................. 712/30; 712/32

(58) Field of Classification Search
None
See application file for complete search history.

(56) References Cited

U.S. PATENT DOCUMENTS

| | | | |
|---|---|---|---|
| 5,034,882 A | | 7/1991 | Eisenhard et al. |
| 5,301,333 A | | 4/1994 | Lee |
| 5,826,065 A | * | 10/1998 | Hinsberg et al. ............... 717/104 |
| 5,963,731 A | * | 10/1999 | Sagawa et al. ..................... 703/6 |
| 7,124,071 B2 | * | 10/2006 | Rich et al. ........................ 703/16 |
| 7,630,875 B2 | * | 12/2009 | King et al. ....................... 703/14 |
| 2005/0091025 A1 | * | 4/2005 | Wilson et al. ................... 703/16 |
| 2006/0059286 A1 | * | 3/2006 | Bertone et al. ................. 710/260 |
| 2006/0212630 A1 | * | 9/2006 | Hoshina et al. ............... 710/109 |
| 2007/0263450 A1 | * | 11/2007 | Cernea et al. ............ 365/185.21 |
| 2008/0168466 A1 | * | 7/2008 | Nitta et al. ..................... 718/105 |
| 2008/0263280 A1 | * | 10/2008 | Gara et al. ..................... 711/121 |
| 2009/0067244 A1 | * | 3/2009 | Li et al. .................... 365/185.12 |

FOREIGN PATENT DOCUMENTS

| | | |
|---|---|---|
| EP | 0356110 A2 | 2/1990 |
| JP | 09-265403 | 10/1997 |
| JP | 10-154136 | 6/1998 |
| JP | 11-282819 | 10/1999 |
| JP | 2002-123497 | 4/2002 |
| JP | 2002-358293 | 12/2002 |
| JP | 2007-219816 | 8/2007 |

OTHER PUBLICATIONS

Extended European Search Report issued Oct. 4, 2012 in corresponding European Patent Application No. 09851287.4.
Patent Abstracts of Japan, Publication No. 2002-358293, Published Dec. 13, 2002.
Patent Abstracts of Japan, Publication No. 09-265403, Published Oct. 7, 1997.

(Continued)

*Primary Examiner* — Eric Coleman
(74) *Attorney, Agent, or Firm* — Staas & Halsey LLP

(57) ABSTRACT

Computational unit area selecting units, each of which is provided in individual multiple cores, sequentially select uncomputed computational unit areas in a computational area. Computing units, each of which is provided in the individual multiple cores, perform computation for the selected computational unit areas. In addition, the computing units write computational results in a memory device which is accessible from each of the multiple cores. Computational result transmitting unit of the core performs computational result acquisition and transmission processing in a different time period with respect to each of multiple computational result transmission areas. The computational result acquisition processing is for acquiring, from the memory device, computational results related to the computational result transmission areas.

10 Claims, 21 Drawing Sheets

(56) References Cited

OTHER PUBLICATIONS

Patent Abstracts of Japan, Publication No. 2007-219816, Published Aug. 30, 2007.
Patent Abstracts of Japan, Publication No. 10-154136, Published Jun. 9, 1998.
Patent Abstracts of Japan, Publication No. 2002-123497, Published Apr. 26, 2002.
Patent Abstracts of Japan, Publication No. 11-282819, Published Oct. 15, 1999.
International Search Report in PCT/JP2009/069443, dated Dec. 8, 2009.

* cited by examiner

| NUMBER OF PROCESSORS | COMPUTATIONAL LATTICE POINTS PER PROCESSOR | PROPORTION OF LATTICE POINTS IN MARGINAL AREAS |
|---|---|---|
| 16 | 625000 | 0.09 |
| 64 | 156250 | 0.18 |
| 144 | 69444 | 0.27 |
| 256 | 39063 | 0.35 |
| 1024 | 9766 | 0.62 |

142 MARGIN INFORMATION STORING UNIT

142a MARGIN MANAGEMENT TABLE

| MARGIN ID ("hid") | BLOCK COUNT ("halo[hid].blknum") | PROCESSED BLOCK COUNT ("halo[hid].calcnum") | EXCHANGE PROCESSING COMPLETE FLAG ("halo[hid].down") | BLOCK ID ("halo[hid].id[blocknum]") |
|---|---|---|---|---|
| 1 | 11 | 4 | off | 1,2,3,4,... |
| 2 | 11 | 2 | off | 1,12,23,... |
| 3 | 11 | 2 | off | 11,22,... |
| 4 | 11 | 0 | off | 11,... |

→ PRIORITY ORDER OF BLOCK SELECTION: HIGH
--→ PRIORITY ORDER OF BLOCK SELECTION: LOW

242 MARGIN INFORMATION STORING UNIT

242a MARGIN MANAGEMENT TABLE

| MARGIN ID ("hid") | BLOCK COUNT ("halo[hid].blknum") | PROCESSED BLOCK COUNT ("halo[hid].calcnum") | EXCHANGE PROCESSING COMPLETE FLAG ("halo[hid].down") | BLOCK ID ("halo[hid].id[blocknum]") | LAST COMPUTATIONAL BLOCK ID ("halo[hid].lastblock") |
|---|---|---|---|---|---|
| 1 | 11 | 4 | off | 1,2,3,4,... | – |
| 2 | 11 | 2 | off | 1,12,23,... | – |
| 3 | 11 | 2 | off | 11,22,... | – |
| 4 | 11 | 0 | off | 11,... | – |

FIG. 19

PARALLEL COMPUTING APPARATUS AND PARALLEL COMPUTING METHOD

CROSS-REFERENCE TO RELATED APPLICATION

This application is a continuing application, filed under 35 U.S.C. §111(a), of International Application PCT/JP2009/069443, filed on Nov. 16, 2009.

FIELD

The present invention is directed to a parallel computing apparatus, a parallel computing method, and a parallel computing program.

BACKGROUND

Along with the advances in technology, multi-core processors (for example, central processing units (CPUs)) having multiple cores, which are processing units, are taking hold in late years. Dual-core processors having two cores and quad-core processors having four cores are examples of multi-core processors. Further, as referred to as multi-core implementation, processors containing several tens of cores in a single large scale integrated circuit (LSI) have appeared, and thus it is predicted that LSIs with multiple cores will be increasingly developed in the future.

Furthermore, multi-node (process), multi-core systems formed with several thousand to several tens of thousands of computing nodes having such LSIs are now becoming the mainstream of supercomputers in the current high performance computing (HPC) field. Such supercomputers have conventionally been very involved with large-scale simulations in the weather forecast field, the biological field such as gene analyses, and the nanotechnology field, thus contributing to the development of various types of science and technology.

In addition, at the same time as the development of the multi-node, multi-core supercomputers, various large-scale simulation techniques in the scientific computing field are also developed. For example, a proposed technique ensures differences among bases (collections of discrete points, whose positions are used to calculate physical quantities) of individual simulation processes when the simulation processes are executed in parallel to each other.

In the implementation of multi-node systems, it is sometimes the case that the time of communication among processors interconnected to one another adversely affects the processing time of an application program which is an execution target. Therefore, it is important to reduce communication processing to thereby speed up the application program. One technique for processing speed-up is, for example, to prevent an increase in the communication load of a master unit by controlling, among slave units, boundary value data obtained from an analysis operation. Thus, computational algorithms of applications and parallelization techniques are improved for multi-node systems having multiple computing nodes to thereby promote processing efficiency. Please see, for example, Japanese Laid-open Patent Publications Nos. 10-154136 and 2002-123497.

However, conventional improvements of parallelization techniques are focused on speeding up parallel processing of processes executed by individual nodes of a multi-node system, and not sufficient studies have been taken on to speed up parallel processing of threads executed by individual cores in a multi-core processor. For example, multi-node parallel processing technology is applied to multi-core systems in such a manner that processing is equally distributed across individual cores (threads). However, no attention has been paid to speed-up of parallel processing which takes into account the characteristics of the multi-core systems.

SUMMARY

In one aspect of the embodiments, there is provided a parallel computing apparatus. The apparatus includes: a processor configured to execute parallel computation for a computational area that is a whole set of element points for computation, the computational area being divided into a plurality of computational unit areas and provided with a plurality of computational result transmission areas each including at least one of the plurality of the computational unit areas, wherein the processor includes a plurality of cores, and each of the plurality of cores selects uncomputed computational unit areas from the computational unit areas in the computational area, sequentially, performs computation for the selected computational unit areas, and writes computational results in a memory that is accessible from each of the plurality of cores, and at least one of the plurality of cores acquires computational results of the at least one of the computational unit areas included in each of the computational result transmission areas from the memory and transmits the acquired computational results to a transmission destination in a different time period with respect to each of the computational result transmission areas.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates occupancy of marginal areas according to the number of processors;

FIG. 12 illustrates an example of a data configuration of a margin information storing unit;

FIG. 19 illustrates an example of a data configuration of a margin information storing unit according to the third embodiment;

DESCRIPTION OF EMBODIMENTS

Embodiments are explained next with reference to the drawings.

First Embodiment

Figure 1:
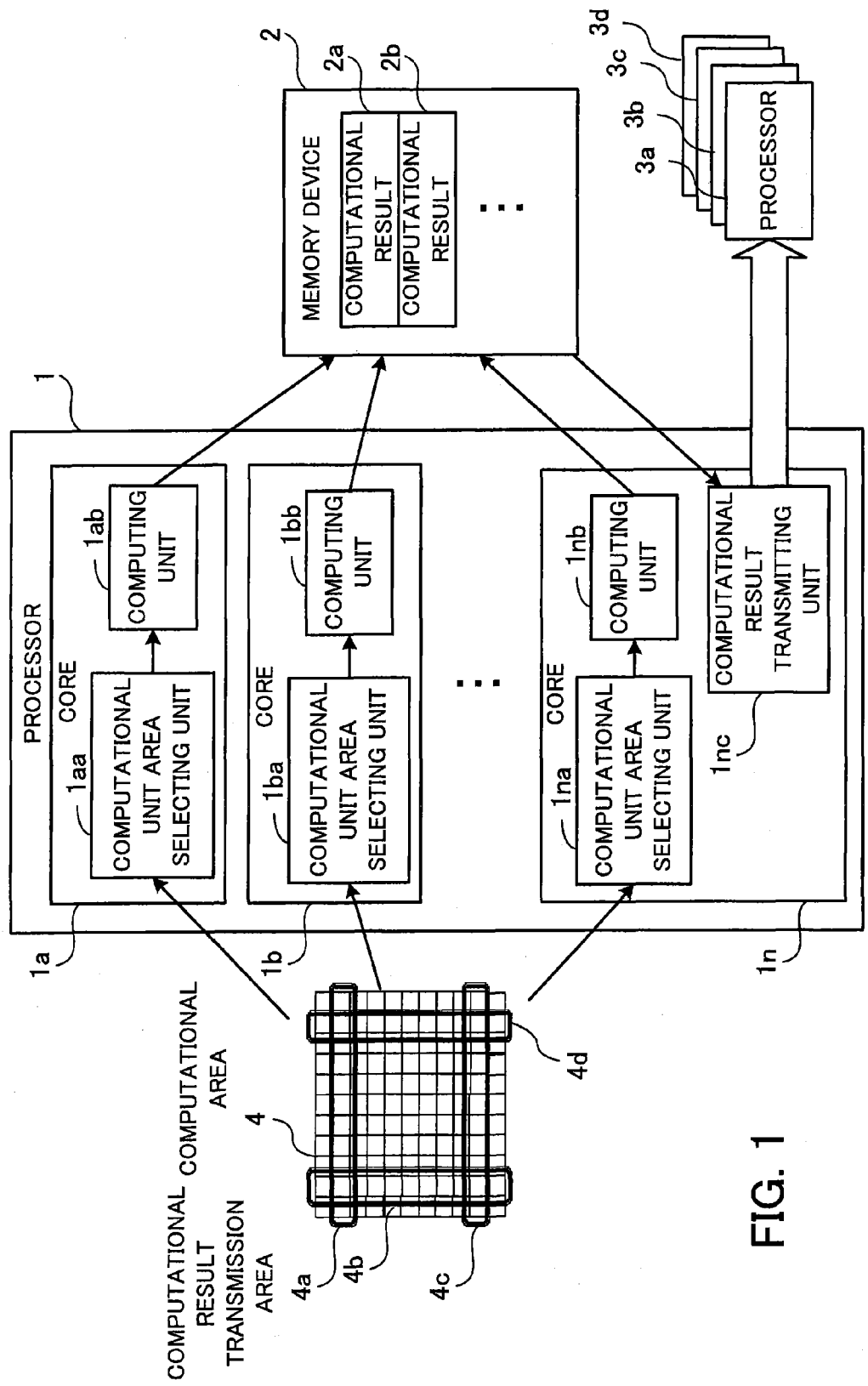
FIG. 1 is a block diagram illustrating functions of a parallel computing apparatus according to a first embodiment.

FIG. 1 is a block diagram illustrating functions of a parallel computing apparatus according to a first embodiment. In this description, the term "computational area" is defined as a whole set of element points which are used by computing nodes, such as processors, of the parallel computing apparatus for computation. In the parallel computing apparatus to be provided, a processor 1 which functions as a processing device and includes multiple cores 1a, 1b, . . . , and 1n functioning as processing units executes parallel computation for a computational area 4.

The computational area 4 is partitioned into multiple computational unit areas. In addition, the computational area 4 is provided with multiple computational result transmission areas 4a, 4b, 4c, and 4d, each of which includes at least one computational unit area. The multiple cores 1a, 1b, . . . , and 1n of the processor 1 individually include computational unit area selecting units 1aa, 1ba, . . . , and 1na, respectively, which sequentially select uncomputed computational unit areas in the computational area 4. Further, the multiple cores 1a, 1b, . . . , and 1n of the processor 1 individually include computing units 1ab, 1bb, . . . , and 1nb, respectively, which perform computation for the computational unit areas selected by the computational unit area selecting units 1aa, 1ba, . . . , and 1na, respectively. The computing units 1ab, 1bb, . . . , and 1nb write computational results 2a, 2b, . . . in a memory device 2 which is accessible from each of the multiple cores 1a, 1b, . . . , and 1n. At least one core in in the processor 1 includes a computational result transmitting unit 1nc for acquiring, from the memory device 2, the computational results of the computational result transmission areas 4a, 4b, 4c, and 4d and performing transmission processing of the computational results. The computational result transmitting unit 1nc performs the acquisition of the computational results and the transmission processing in different time periods with respect to the individual computational result transmission areas 4a, 4b, 4c, and 4d. According to the example of FIG. 1, the computation results are transmitted to other processors 3a, 3b, 3c, and 3d.

According to such a parallel computing apparatus, uncomputed computational unit areas in the computational area 4 are sequentially selected by the individual computational unit areas selecting units 1aa, 1ba, . . . , and 1na of the multiple cores 1a, 1b, . . . , and 1n. In addition, computation for the computational unit areas selected by the computational unit area selecting units 1aa, 1ba, . . . , and 1na is performed by the individual computing units 1ab, 1bb, . . . , and 1nb of the multiple cores 1a, 1b, . . . , and 1n. By the computing units 1ab, 1bb, . . . , and 1nb, the computational results 2a, 2b, . . . are written in the memory device 2 accessible from each of the multiple cores 1a, 1b, . . . , and 1n. The acquisition of the computational results of the computational result transmission areas 4a, 4b, 4c, and 4d from the memory device 2 and the transmission processing of the acquired computational results are performed by the computational result transmitting unit 1nc of the core 1n in different time periods with respect to the individual computational result transmission areas 4a, 4b, 4c, and 4d.

As described above, transmitting the individual computational results in different time periods with respect to each of the multiple computational result transmission areas 4a, 4b, 4c, and 4d prevents a decrease in processing efficiency which would occur if the transmission processing of multiple computational results were performed simultaneously. Assume that the computational results for the computational unit areas in the individual computational result transmission areas 4a, 4b, 4c, and 4d are to be transmitted to the processors 3a, 3b, 3c, and 3d. At this time, for example, the computational results to be transmitted are stored in continuous memory areas in a main memory device. Subsequently, the computational results are transmitted from the main memory device to the processor 3a, 3b, 3c, and 3d. At this point, if multiple transmission processes are executed in parallel at the same time, accesses to the main memory device for the process of writing the computational results thereto compete with each other, which results in reducing individual process efficiencies. On the other hand, according to the parallel computing apparatus of FIG. 1, the transmission processes are not executed in parallel at the same time. As a result, it is possible to efficiently transmit the computational results at the time of the execution of the parallel processing in the multi-core processor 1.

Massive parallelization of supercomputers developed from here on is anticipated to advance, and implementation of multi-core processors contributes largely to massive parallelization of processing. If the massive parallelization advances, it becomes further important to upgrade the processing speed by dividing an application program into segments and performing local communication across dividing lines. Improvement in the process efficiency of a multi-core processor by using the technique of the first embodiment enables the communication capacity among processors, which makes a contribution to advance in future massive parallelization.

Second Embodiment

A second embodiment is directed to an improvement in the efficiency of data exchange processing among processors at the time of the execution of a physical simulation using a multi-core processor. First described is data to be exchanged among the processors in a physical simulation.

Figure 2:
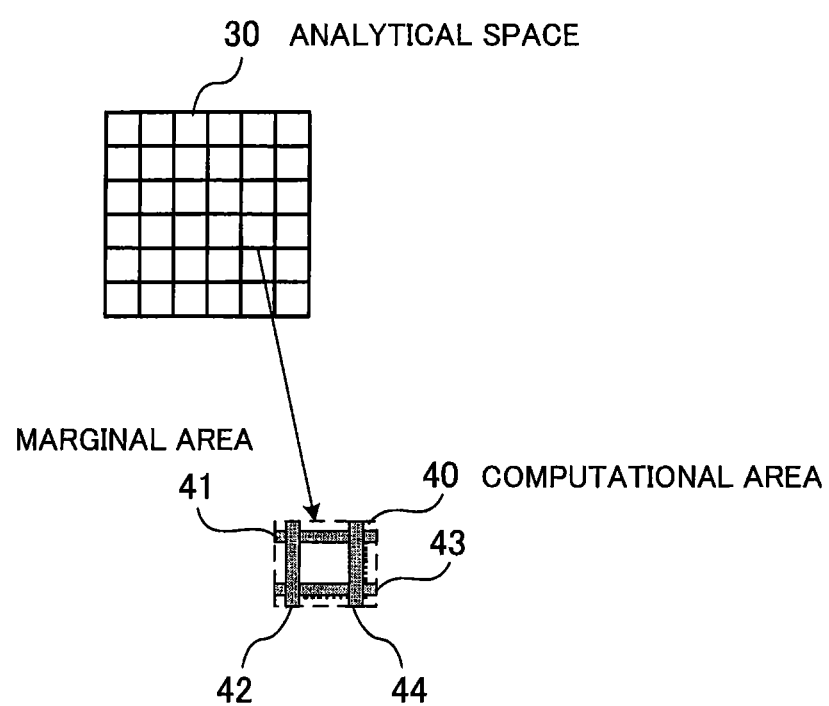
FIG. 2 illustrates an analytical space of a physical simulation.

FIG. 2 illustrates an analytical space of a physical simulation. In a multidimensional analytical space 30 of the physical simulation, multidimensional computational areas are finely partitioned in a lattice form, and physical quantities at lattice points (element points being computing targets) are computed. In addition, the analytical space 30 is divided into multiple computational areas. Each computational area is allocated to a processor. The processor performs computation with respect to the space of the allocated computational area. Multiple processors compute physical quantities of the individual computational areas in parallel, and with this, parallel computation of a physical simulation in the analytical space 30 is achieved.

In a physical simulation using a difference method, physical quantities are computed over the simulation time, and time change of the physical quantities is analyzed. The types of the physical quantities to be computed are various, such as an electric field, magnetic field, temperature, and wind speed. Physical quantities for the analytical space 30 at a predetermined simulation time are computed using physical quantities for the analytical space 30 obtained at a simulation time immediately before the predetermined simulation time. At this point, physical quantities for a single computational area are computed using physical quantities for the computational area obtained at the simulation time immediately before the predetermined simulation time as well as physical quantities of neighboring areas (lattice points) obtained at the simulation time immediately before the predetermined simulation time (boundary data). The boundary data reflects the physical quantities around the analysis-target computational area. Therefore, using the boundary data for the computation enables an analysis which reflects the interrelated influence of the computational areas.

Thus, in the case where the difference method is used in computing physical quantities for each computational area, a process of exchanging the boundary data of each of areas allocated to individual processors with neighboring processors is performed. Such an exchange of the boundary data among processors is referred to as "margin exchange". In addition, areas, within a single computational area 40, used for margin exchange are referred to as marginal areas 41 to 44.

Figure 3:
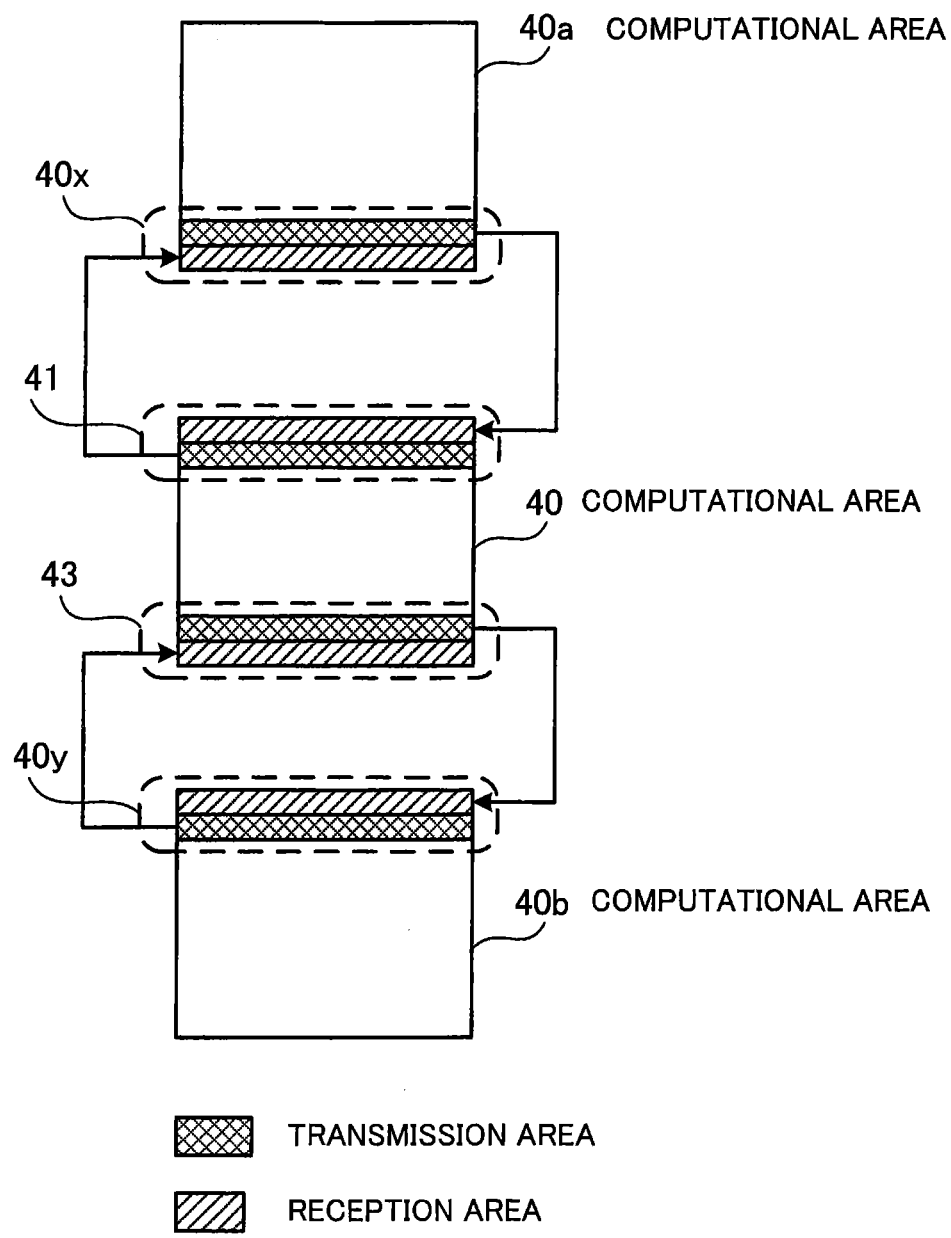
FIG. 3 illustrates margin exchange.

FIG. 3 illustrates margin exchange. When an analysis at one simulation time step is finished, margin exchange is performed among computational areas 40, 40a, and 40b for an analysis at the next simulation time step, which is ahead of the one simulation time step by one time step. For example, the computational area 40 includes the marginal area 41 to be used for margin exchange with the computational area 40a and the marginal area 43 to be used for margin exchange with the computational area 40b. The computational area 40a includes a marginal area 40x to be used for margin exchange with the computational area 40. The computational area 40b includes a marginal area 40y to be used for margin exchange with the computational area 40.

Each of the marginal areas 41, 43, 40x, and 40y is divided into a transmission area and a reception area. Areas adjacent to the outer periphery of each of the computational areas 40, 40a, and 40b are the reception areas, and areas adjacent to the reception areas on the inward side are the transmission areas. Physical quantities for the transmission areas computed for the individual computational areas 40, 40a, and 40b are transferred as the boundary data to the reception areas of neighboring computational areas.

In the case of performing an analysis using multiple processors, physical quantities of the internal areas of the computational areas 40, 40a, and 40b are computed by individual processors. Therefore, the margin exchange is achieved by communication among the processors.

Figure 4:
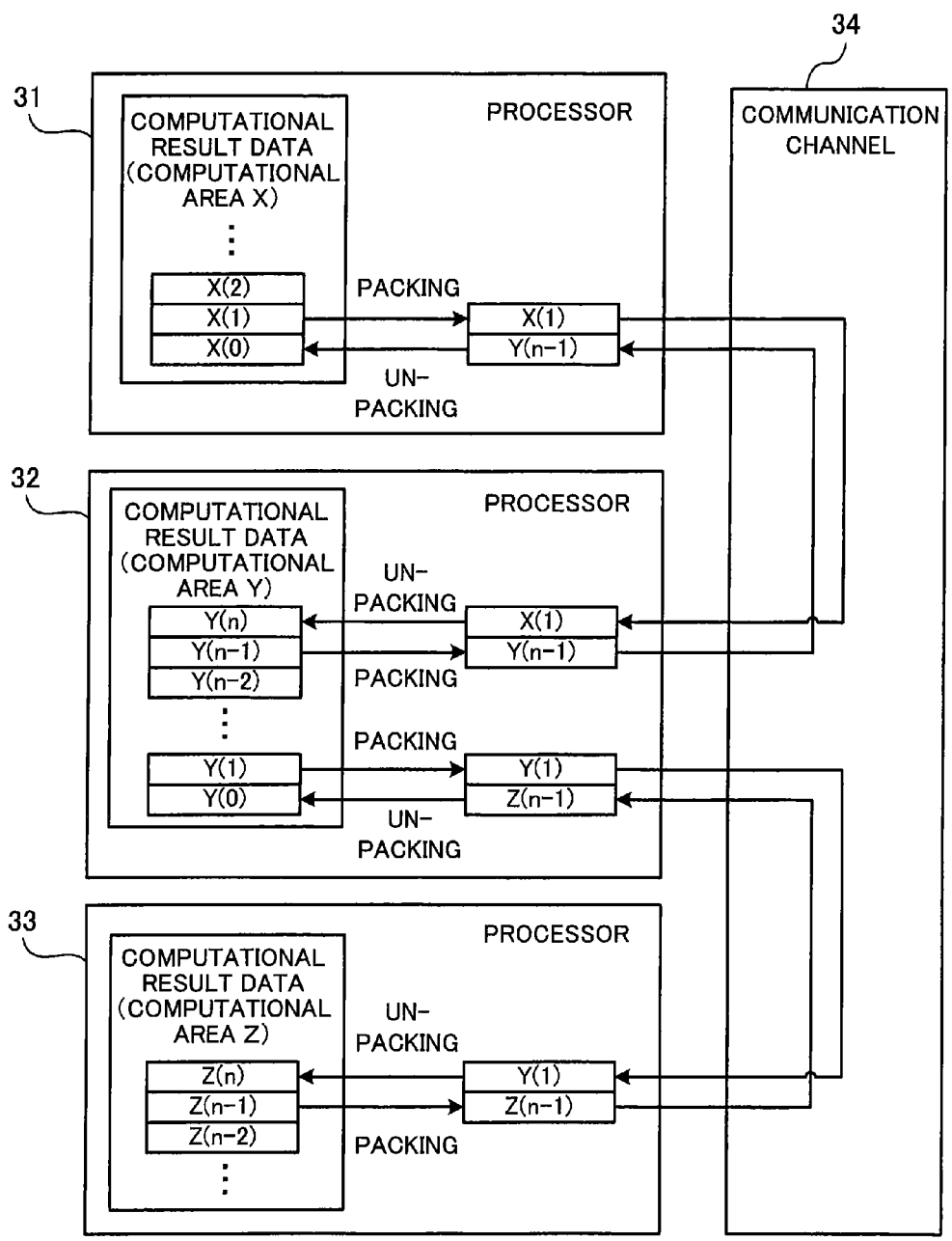
FIG. 4 illustrates data communication among processors for margin exchange.

FIG. 4 illustrates data communication among processors for margin exchange. In the margin exchange, three-stage processing is performed: (1) packing of boundary data in a transmission area; (2) transmitting and receiving the packed data; and (3) unpacking of the received data.

The data packing processing here is a process for integrating, into one dataset, data of physical quantities of all blocks included in the transmission area of a marginal area after computation of all the blocks in the transmission area is finished. The data integration here means storing the data in continuous memory areas.

The data unpacking processing here is a process for separating the boundary data received from another processor into physical quantities of individual blocks in a reception area and storing the physical quantities in set areas for the individual blocks. If the areas for storing the physical quantities included in the received data are not continuous, values indicating that the physical quantities are stored in discontinuous areas are stored in the unpacking processing.

Assume a case in which multiple processors 31 to 33 are connected by a communication channel 34, as illustrated in FIG. 4. The processor 32 performs margin exchange with the processors 31 and 33. At this point, assume here that the processor 31 performs computation of a computational area X, the processor 32 performs computation of a computational area Y, and the processor 33 performs computation of a computational area Z. Also, assume that the computational area Y is sandwiched between the computational areas X and Z. In this case, in the processor 32, the following processes take place: packing of data to be transmitted to the processor 31; unpacking of data received from the processor 31; packing of data to be transmitted to the processor 33; and unpacking of data received from the processor 33.

Next considered is packing and unpacking processing in margin exchange in the case where there are four marginal areas 41 to 44 on four sides, as in the computational area 40 of FIG. 2.

Figure 5:
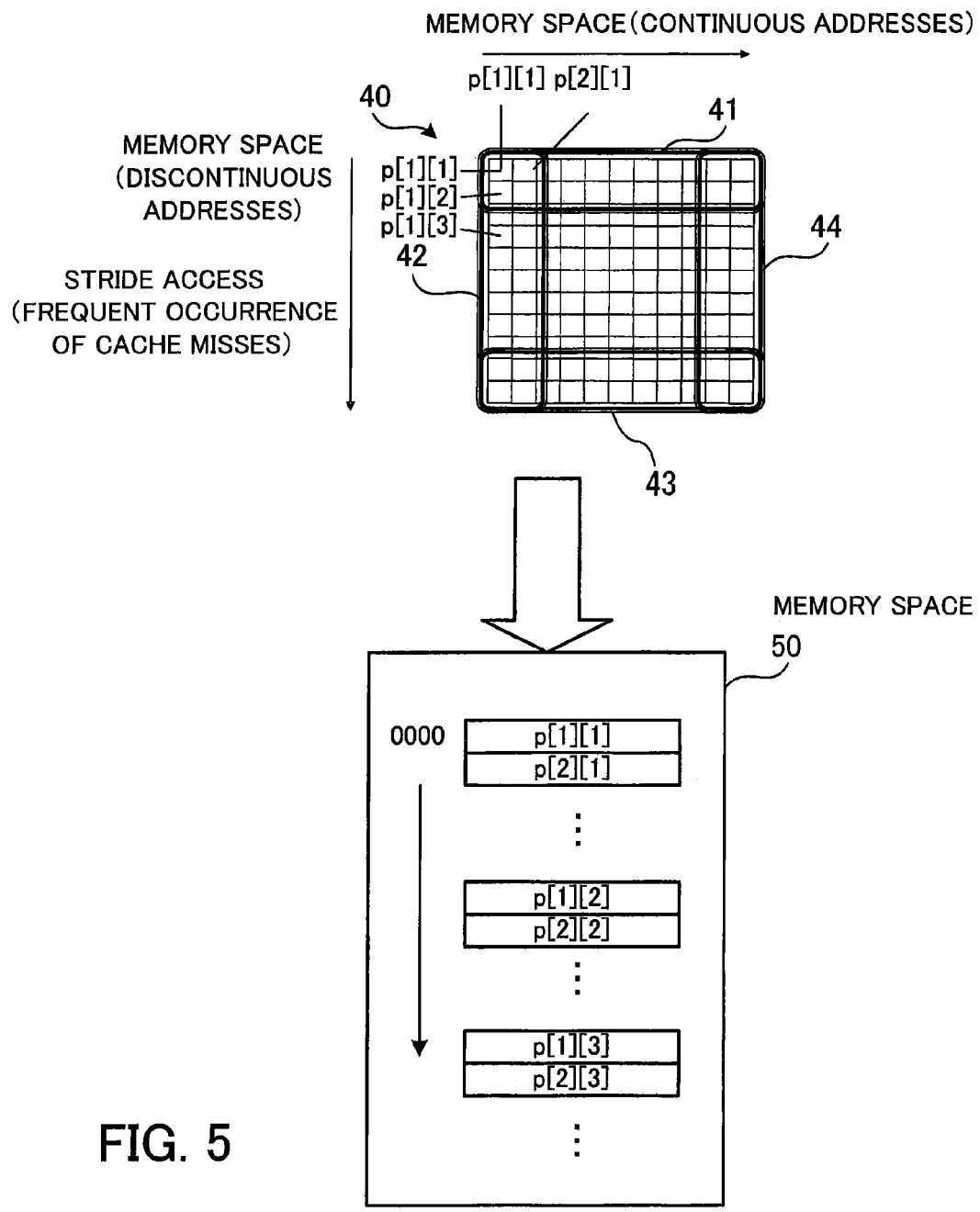
FIG. 5 illustrates packing and unpacking of boundary data.

FIG. 5 illustrates packing and unpacking of boundary data. As illustrated in FIG. 5, the computational area 40 is further divided by a lattice. With this, further finer areas are generated. Each of the areas is referred to as a block. Cores in processors compute physical quantities of individual blocks in assigned computational areas. The block size is determined in accordance with, for example, sizes of primary or secondary cache memories in the cores. As illustrated in FIG. 5, multiple blocks are included in the marginal areas 41 to 44.

Here, the blocks in the computational area 40 are arranged in a multidimensional array. On the other hand, addresses in a memory space 50 for storing physical quantities of the individual blocks are arranged in one dimension. Accordingly, it is sometimes the case that the sequence in the memory space 50, which stores the physical quantities of the individual blocks in the marginal areas, is discontinuous.

For example, data of a block in an x-th column and in a y-th row in the computational area 40 is denoted as p[x][y]. Assume here that, in the memory space 50, addresses of the memory areas are sequentially allocated to blocks with smaller row numbers. In this case, for areas continuous in the row direction, such as the marginal areas 41 and 43, it is possible to collectively read data from the memory and pack the data. At the time of unpacking, received boundary data is written in continuous areas in the memory. Accordingly, the packing and unpacking processing for the marginal areas 41 and 43 is executed in a short amount of time.

On the other hand, as with areas continuous in the column direction, such as the marginal areas 42 and 44, data of the individual blocks is arranged in discontinuous areas in the memory. There is a method for accessing a memory, called "stride access". In a stride access, data having a predetermined continuous length (for example, one line) is collectively transferred to a cache memory at the time of reading from the memory. However, at the time of reading data of the marginal areas 42 and 44 from the memory to the cache memory, the data is discontinuous and therefore the access becomes a stride access. As a result, because the alignment of cache lines is disrupted, unnecessary data is included in one line and the cache memory is heavily burdened with unnecessary data, which results in an increase in cache misses. Therefore, for the marginal areas 42 and 44, the number of accesses for reading data from the memory increases and accordingly the packing and unpacking processing takes long time.

Next examined is the ratio between the time required for data analysis of the entire analytical space 30 and the time required for the data packing and unpacking processing. First, the time required by one processor (i.e., one block in a multiprocessor) to calculate physical quantities for one block is denoted as $\tau$.

For example, assume that the computational area is in a three dimensional array with n blocks (where n is a natural number) on each side and there are P processors (where P is a natural number). In this case, the computational processing time required to compute physical quantities of the entire analytical area is $\tau(n^3/P)$. On the other hand, the time required for the data packing and unpacking processing is about $\tau((n^3/P)^{2/3})$. Therefore, the ratio of the time for the data packing and unpacking processing to the computational processing time is $P^{1/3}/n$. As a result, in massively parallel computers having more than a thousand processors, the ratio of the time for the data packing and unpacking processing to the computational processing time becomes large.

Further, the case is taken into account where the computational area is in a multiple dimensional array with n blocks on each side. If the number of processors increases due to advancement in massive parallelization, an area allocated to each processor after division of the computational area becomes small. With this, the amount of computational processing performed by each processor becomes small. At this point, the width of each marginal area is fixed and independent of the number of processors. Accordingly, the proportion of the area size of margin exchange to the entire computational area becomes large, and the margin exchange processing accounts for a large part of the entire computational processing.

FIG. 6 illustrates the occupancy of marginal areas according to the number of processors. According to the example of FIG. 6, a space with 10,000,000 lattice points (for example, 500, 500, and 40 lattice points in the x-, y-, and z-axis directions, respectively) is considered. The space is divided into computational areas in accordance with the number of processors, and physical quantities for the individual multiple computational areas are computed in parallel by the multiple processors. Assume that the individual computational areas are arranged in a two dimensional plane (x-y plane). Also, assume that the width of each of the transmission and reception areas in margin exchange corresponds to three lattice points.

In this case, if the number of processors is 16, the number of computational lattice points for one processor is 625,000 and the proportion of lattice points in the marginal areas is 0.09. On the other hand, if the number of processors is 1024, the number of computational lattice points for one processor is 9,766 and the proportion of lattice points in the marginal areas is 0.62. Thus, as the number of processors increases, the proportion of the lattice points in the marginal areas to the entire computational area becomes large. This indicates that the amount of processing required for margin exchange increases when the number of processor increases. In other words, a reduction in the processing load of the margin exchange enhances the effect of improving the processing speed achieved by an increase in the number of processors used in the parallel processing.

Next examined is a reduction in the processing load of the margin exchange in a multi-core processor. As described above, one of the main processes of the margin exchange is the data packing and unpacking processing. The data packing and unpacking processing is a data copy process in which communication data is newly created from data of marginal areas for which computational processing is finished. Detailed main processing performed in the processor during the data packing and unpacking processing is executed by load and store commands. The load command executes a process of reading data from the cache memory or the main memory. The store command executes a process of writing data into the cache memory or the main memory.

In the case of performing the data packing and unpacking processing using all cores in a multi-core environment, a great number of load and store commands may be issued from multiple cores at the same time. In the case where a secondary cache memory is shared, the cache memory is heavily burdened with simultaneous accesses from all the cores. In addition, access concentration to the memory also occurs due to writing of packed data thereto.

In the case where the computational area is, for example, three dimensional space, the data packing and unpacking processing is performed for each of marginal areas on six planes. In memory accesses for four planes among the six planes, cache line misses occur frequently due to the stride access, and the number of accesses to the memory increases during the data packing and unpacking. As a result, the usability of the processor decreases. Thus, it is understood that the memory access processing for the data packing and unpacking processing has a large influence on the total processing time.

In particular, in conventional physical simulations, the margin exchange processing (i.e., packing, transmission, and unpacking of data) is performed after computation for all the computational areas is finished. Therefore, in the case where there are multiple margin exchange areas, even if multiple cores perform in parallel the packing and unpacking processing for each of the margin exchange areas, transfer of packed and unpacked data for the individual margin exchange areas with the memory occurs simultaneously, which results in a reduction in process efficiency.

In view of the above, the second embodiment aims at improving overall system-wide process efficiency by enhancing efficiency of the memory access processing for data packing and unpacking at the time of data transmission and reception.

Figure 7:
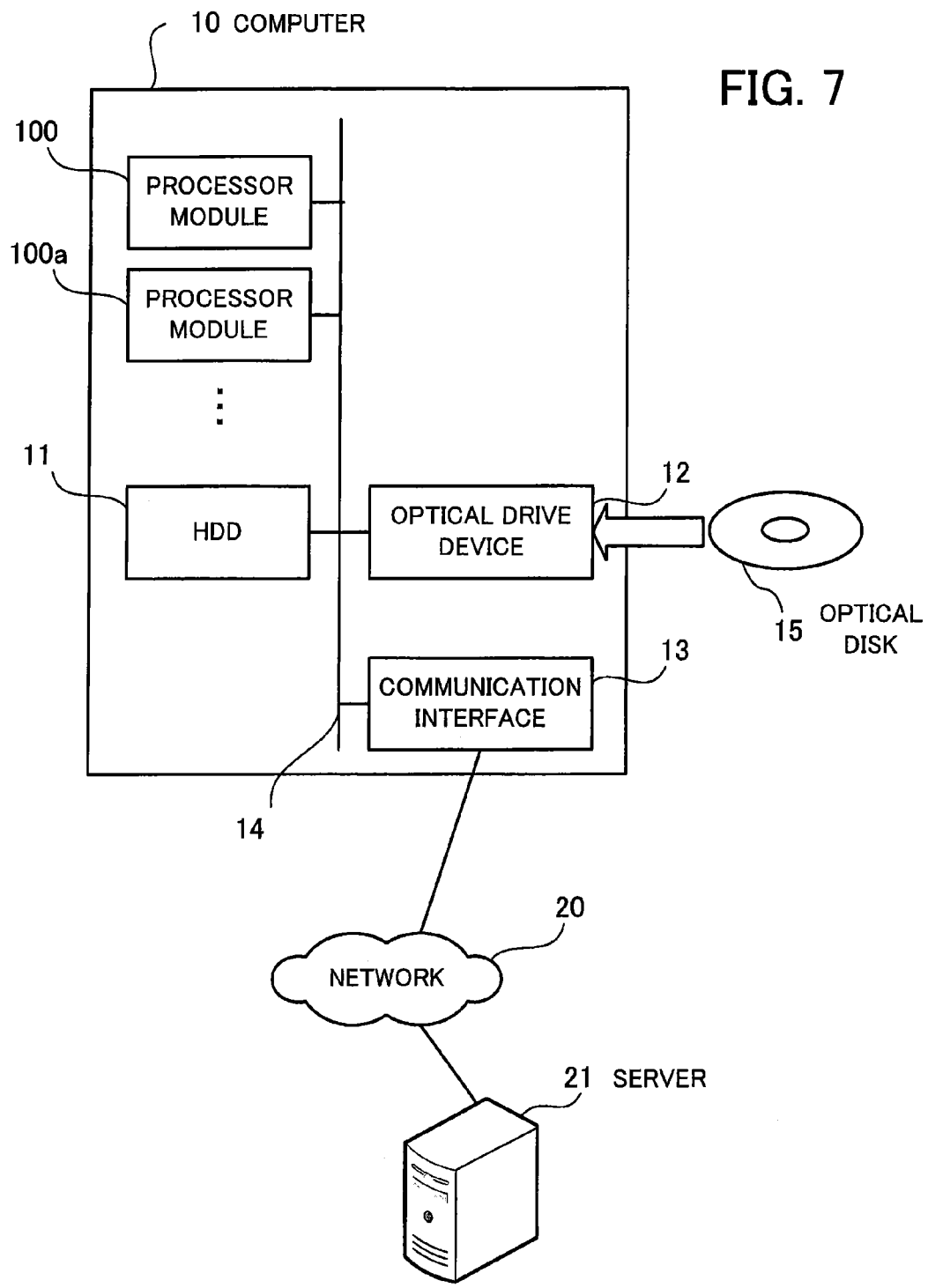
FIG. 7 illustrates an example of a hardware configuration of a computer used in a second embodiment.

FIG. 7 illustrates an example of a hardware configuration of a computer used in the second embodiment. A computer 10 includes multiple processor modules 100, 100a, . . . . The processor modules 100, 100a, . . . are connected to each other by a bus 14. In addition, a hard disk drive (HDD) 11, an optical drive device 12, and a communication interface 13 are also connected to the bus 14.

The HDD 11 magnetically writes and reads data to and from a built-in disk. The HDD 11 is used as a secondary memory device of the computer 10. In the HDD 11, operating system (OS) programs, application programs, and various types of data are stored. Note that, as the secondary memory device, a semiconductor memory device such as a flash memory may be used.

The optical drive device 12 reads data recorded on an optical disk 15 using laser light or the like. The optical disk 15 is a portable recording medium on which data is recorded in such a manner as to be read by reflecting light. The optical disk 15 may be a digital versatile disc (DVD), a digital versatile disc random access memory (DVD-RAM), a compact disc read only memory (CD-ROM), a compact disc recordable (CD-R), or a compact disc rewritable (CD-RW).

The communication interface 13 is connected to a network 20. The communication interface 13 transmits and receives data to and from another computer, such as a server 21, via the network 20.

Figure 8:
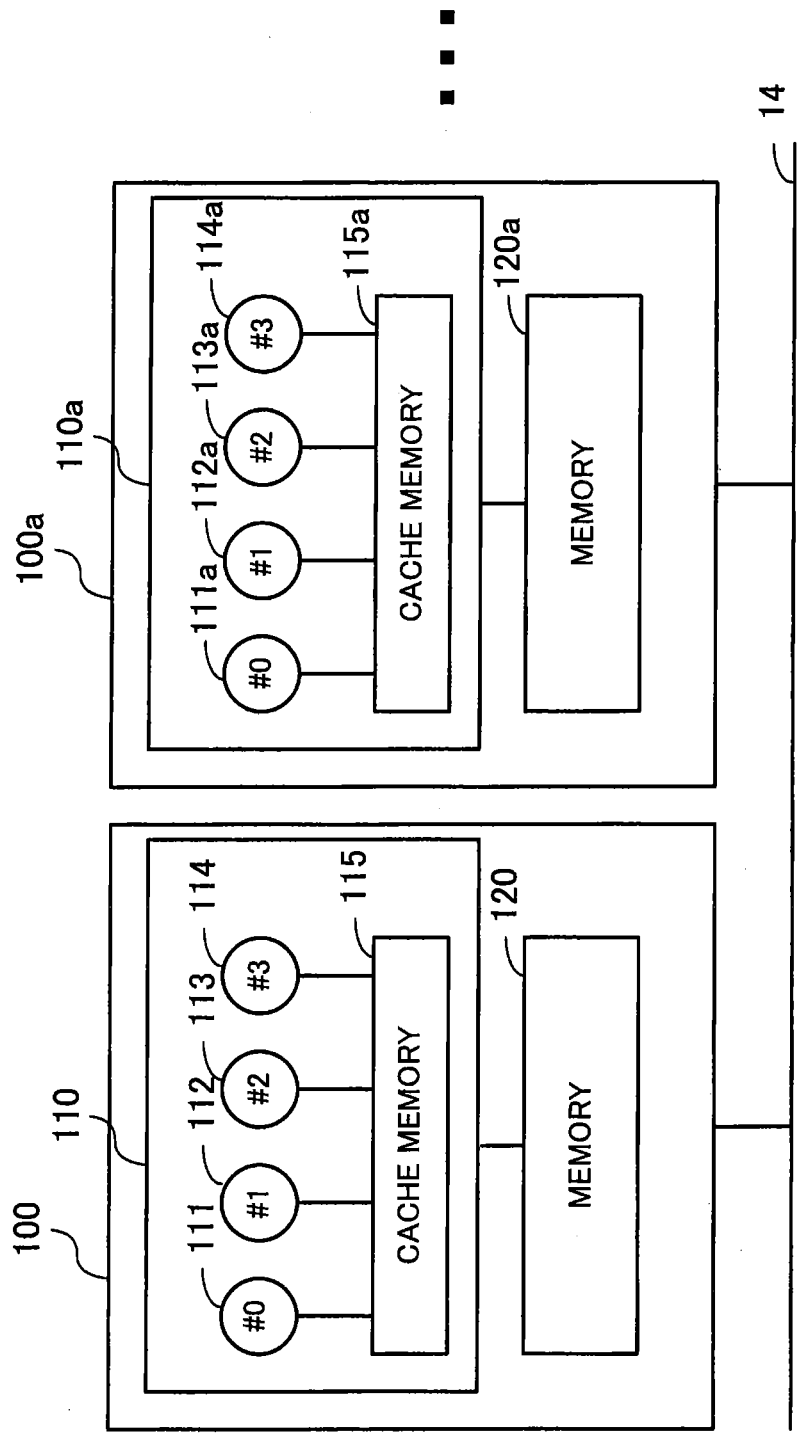
FIG. 8 illustrates one form of an internal configuration of processor modules.

FIG. 8 illustrates one form of the internal configuration of processor modules. The processor module 100 includes a processor 110 and a memory 120. The processor 110 includes multiple cores 111 to 114 and a cache memory 115. The cores 111 to 114 are individually connected to the cache memory 115. Core numbers "#0" to "#3" are assigned to the cores 111 to 114, respectively.

In the similar fashion, the processor module 100a includes a processor 110a and a memory 120a. The processor 110a includes multiple cores 111a, 112a, 113a, and 114a, and a cache memory 115a. The cores 111a, 112a, 113a, and 114a are individually connected to the cache memory 115a. Core numbers "#0" to "#3" are assigned to the cores 111a, 112a, 113a, and 114a, respectively.

With the above-described hardware configuration, processing functions of this embodiment may be achieved.

Figure 9:
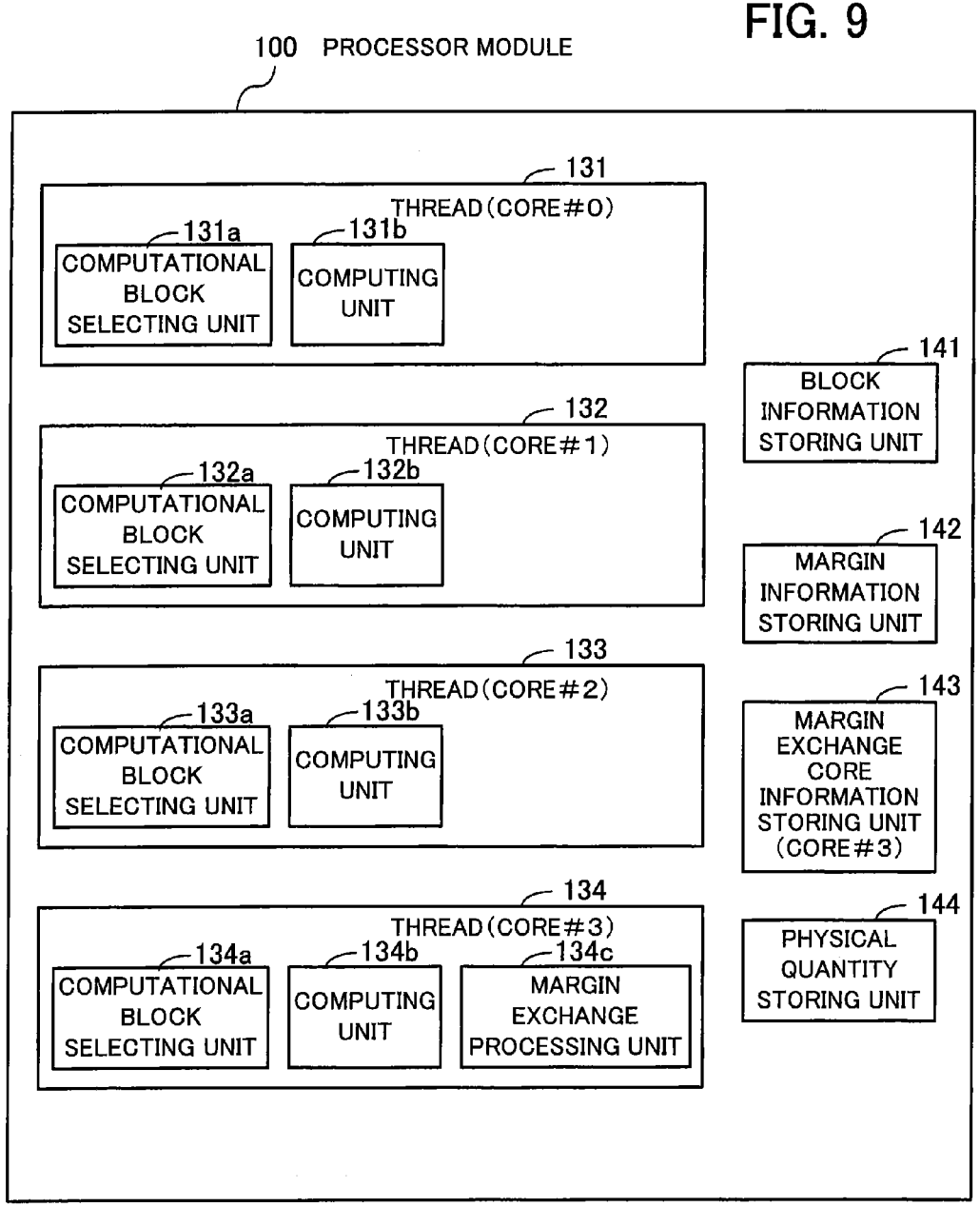
FIG. 9 illustrates processing functions in a processor module at the time of a physical simulation according to the second embodiment.

FIG. 9 illustrates processing functions in a processor module at the time of a physical simulation according to the second embodiment. In the processor module 100, threads 131 to 134 corresponding to the cores 111 to 114, respectively, are generated. Each of the threads 131 to 134 is an executable unit of processing performed by the processor 110.

The thread 131 includes a computational block selecting unit 131a and a computing unit 131b. The computational block selecting unit 131a sequentially selects, from a computational area allocated to the processor module 100, blocks for which computation is to be performed by the thread 131. The computing unit 131b computes physical quantities for each block selected by the computational block selecting unit 131a.

As in the case of the thread 131, the remaining threads 132, 133, and 134 include computational block selecting units 132a, 133a, and 134a and computing units 132b, 133b, 134b, respectively. Note that only the thread 134 includes a margin exchange processing unit 134c.

The margin exchange processing unit 134c performs margin exchange with other processing modules 100a, . . . . Specifically, the margin exchange processing unit 134c performs packing of data in a transmission area, transfer of the packed data, and unpacking of received data into a reception area.

In addition, the processor module 100 also includes, as information storage functions, a block information storing unit 141, a margin information storing unit 142, a margin exchange core information storing unit 143, and a physical quantity storing unit 144.

The block information storing unit 141 serves as a storage function for storing information indicating, with respect to each block in the computational area allocated to the processor module 100 for analysis, whether the block is located within a marginal area and whether computation for the block is finished. For example, a part of the memory area of the cache memory 115 or the memory 120 is used as the block information storing unit 141.

The margin information storing unit 142 is a memory area for storing information indicating a condition of each marginal area. For example, a part of the memory area of the cache memory 115 or the memory 120 is used as the margin information storing unit 142.

The margin exchange core information storing unit 143 is a memory area for storing an identifier of a core which performs margin exchange. According to the example of FIG. 9, the ID (core #3) of the core 114 which executes the thread 134 is preliminarily set in the margin exchange core information storing unit 143. For example, a part of the memory area of the cache memory 115 or the memory 120 is used as the margin exchange core information storing unit 143.

The physical quantity storing unit 144 serves as a storage function for storing physical quantities for each block in the computational area allocated to the processor module 100 for analysis. The physical quantity storing unit 144 stores physical quantities obtained at a current simulation time and physical quantities obtained at one time step prior to the current simulation time. Among the physical quantities obtained at the one time step prior to the current simulation time, physical quantities for the reception areas in the marginal areas are obtained from other processor modules. The physical quantities except ones for the reception areas are calculated by the individual threads 131 to 134. As the physical quantities for the individual blocks obtained at the current simulation time, computational results obtained by the individual threads 131 to 134 are progressively written. For example, a part of the memory area of the cache memory 115 or the memory 120 is used as the physical quantity storing unit 144.

Next described is a method of dividing the analytical space into blocks according to the second embodiment.

Figure 10:
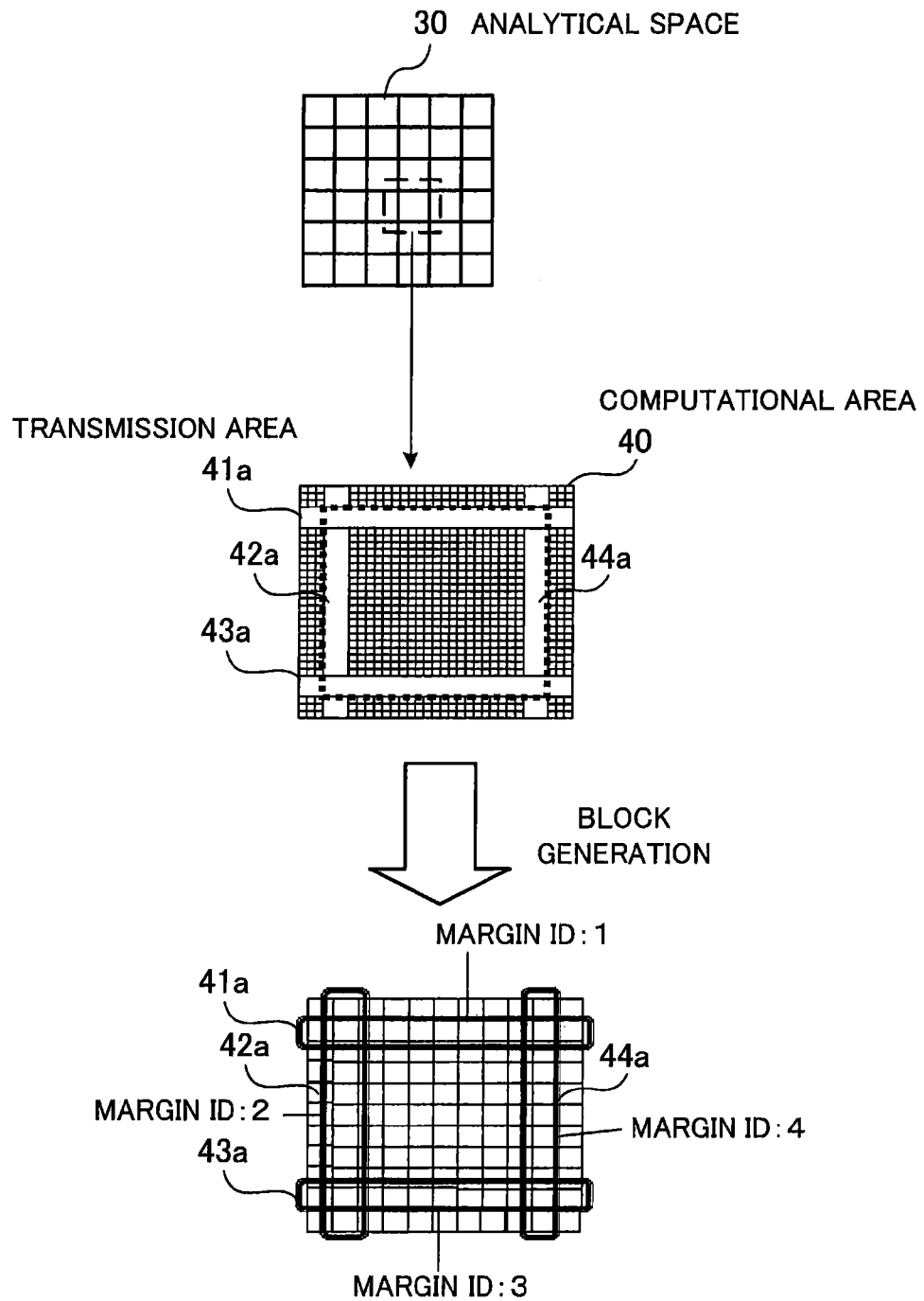
FIG. 10 illustrates a relationship between the analytical space and blocks.

FIG. 10 illustrates a relationship between the analytical space and blocks. According to the example of FIG. 10, the simulation analytical space 30 is divided into two-dimensional computational areas. The computational area 40 is a processing region of one process (one node) at the time when the analytical space 30 is divided into two-dimensionally and parallel processing is performed. The analytical space 30 is divided into multiple computational areas. For example, computational areas as many as the number of the processor modules 100, 100a, . . . are generated. To the processor modules 100, 100a, . . . , computational areas to be analyzed are allocated. In the following description, assume that the computational area 40 is allocated to the processor module 100 for analysis.

The analytical space 30 is divided with a fine lattice spacing. The processor modules 100 computes physical quantities at lattice points in the computational area 40 allocated for analysis. Four marginal areas are set along the left, right, top and bottom sides of the rectangular computational area 40. Within each of the marginal areas, an area adjacent to the outer periphery of the computational area 40 is a reception area. Areas adjacent to the individual reception areas on the inward side are transmission areas 41a, 42a, 43a, and 44a. An identifier (margin ID) is assigned to each of the marginal areas. A margin ID of the marginal area including the transmission area 41a is "1". A margin ID of the marginal area including the transmission area 42a is "2". A margin ID of the marginal area including the transmission area 43a is "3". A margin ID of the marginal area including the transmission area 44a is "4".

The computational area 40 is divided into multiple blocks (cubes). The size of one block can be adjusted to conform to, for example, the size of primary cache memories in the cores 111 to 114. With this, at the time of block-based computational processing, data in a block is collectively stored in the cache memory of a corresponding core, which enhances process efficiency.

According to the example of FIG. 10, the computational area 40 is divided into 11 rows by 11 columns to form blocks. Accordingly, there are 121 blocks (11×11) in the computational area 40. Each of the cores 111 to 114 in the processor module 100 sequentially selects blocks for computation and computes physical quantities at lattice points within each of the selected blocks.

In order to achieve the above-described computation, the following data is held in the processor module 100.

Figure 11:
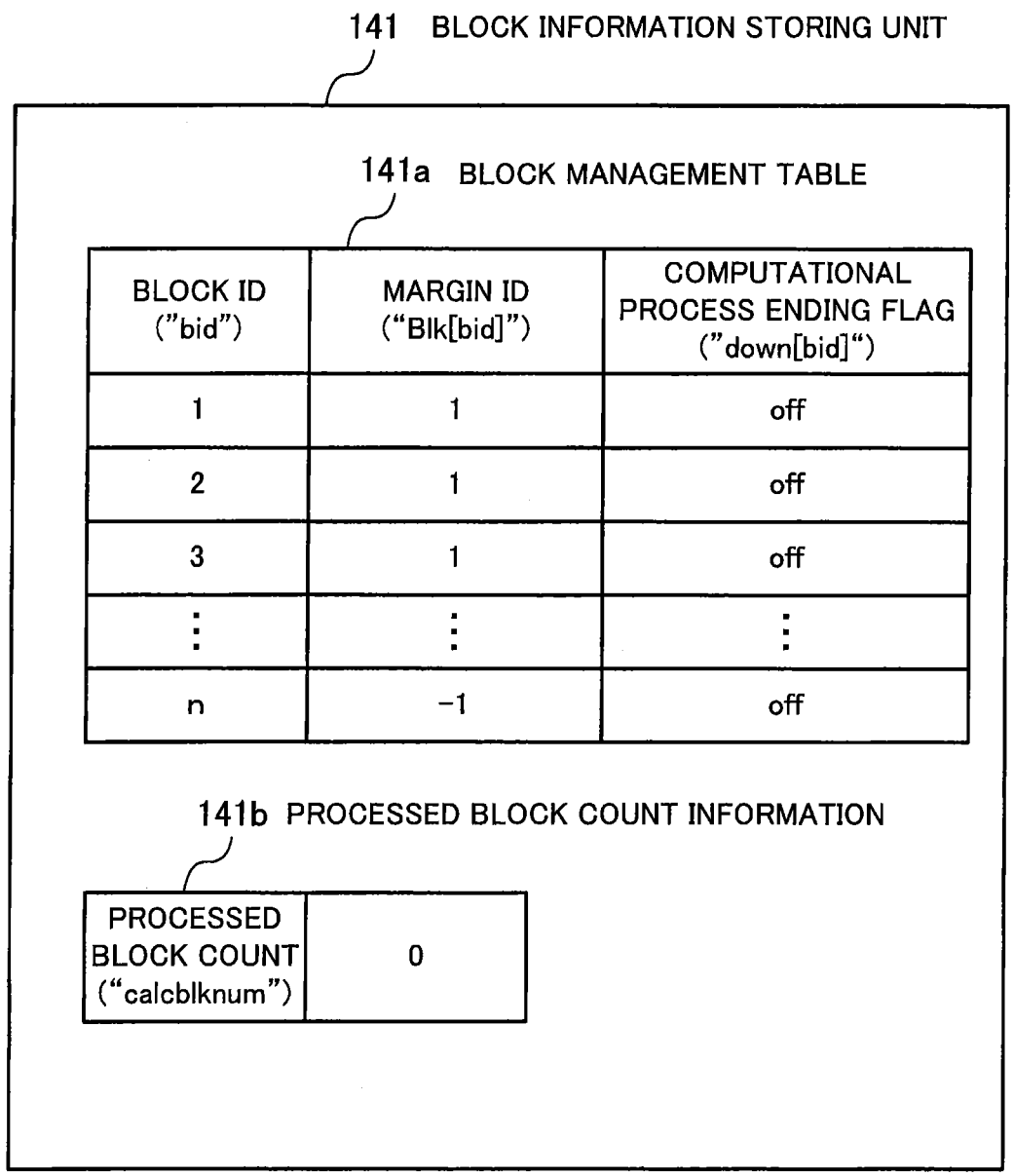
FIG. 11 illustrates an example of a data configuration of a block information storing unit.

FIG. 11 illustrates an example of a data configuration of the block information storing unit. The block information storing unit 141 stores a block management table 141a and a processed block count information 141b. In the block management table 141a, block IDs, margin IDs, and computational process ending flags are set.

In the block ID column, identifiers of the blocks (block IDs) within the computational area 40 are set. The variable name of the block IDs is "bid".

In the margin ID column, symbols are set, each of which indicates whether a corresponding block is located in the transmission area of a marginal area. In the case where the block is located in the transmission area of a marginal area, the identifier (margin ID) of a marginal area to which the block belongs is set in the margin ID column. Note that, for blocks which do not belong to marginal areas, "−1" is set in the margin ID column. The variable name of a margin ID which indicates a marginal area to which each block belongs is "Blk[bid]".

In the computational process ending flag column, flags (computational process ending flags) are set, each of which indicates whether computation of physical quantities for a corresponding block has finished. In the case where the computation has yet to be finished, "off" is set in the computational process ending flag column. In the case where the computation has finished, "on" is set in the computational process ending flag column. When the simulation time moves forward by one time step, all values in the computational process ending flag column are initialized to "off". The variable name of the computational process ending flags is "down [bid]".

Note that, in the example of FIG. 11, information of the individual blocks is stored in a table format in the block information storing unit 141, however, a different data configuration may be used. For example, a pointer is set which indicates an association of each block ID with the margin ID and the computational process ending flag of a block indicated by the block ID. With this, it is also possible to associate these information items with each other.

The processed block count information 141b indicates the total count of blocks (processed block count) for which computational processing of physical quantities has finished. When the simulation time moves forward by one time step, the processed block count is initialized to zero. The variable name of the processed block count is "calcblknum".

FIG. 12 illustrates an example of a data configuration of the margin information storing unit. In the margin information storing unit 142, information is registered in a table format. The registered information indicates the count of processed blocks with respect to each marginal area, and causes the margin exchange core to realize the timing of margin exchange. The margin information storing unit 142 includes a margin management table 142a. The margin management table 142a includes columns for margin ID, block count, processed block count, exchange processing complete flag, and block ID. Information items in each row of the margin management table 142a are associated with each other, and form one record indicating margin information. Note that margin information records as many as the number of margins are registered in the margin management table 142a. According to the second embodiment, the marginal areas are provided in four directions, the positive and negative directions on the horizontal (x) axis and the positive and negative directions on the vertical (y) axis, as illustrated in FIG. 10. Accordingly, four margin information records are registered in the margin management table 142a.

In the margin ID column, identifiers (margin IDs) of the marginal areas are set. The variable name of the margin IDs in the margin management table is "hid".

In the block count column, block counts are set, each of which is the number of blocks belonging to the transmission area of a marginal area indicated by a corresponding margin ID. The variable name of the block counts is "halo[hid].blknum".

In the processed block count column, block counts (processed block counts) are set, each of which is the number of blocks for which computational processing of physical quantities has finished, among the blocks belonging to the transmission area of a marginal area indicated by the corresponding margin ID. According to the second embodiment, the number of blocks belonging to the transmission area of each marginal area is 11, as illustrated in FIG. 10. The variable name of the processed block counts is "halo[hid].calcnum".

In the exchange processing complete flag column, flags (exchange processing complete flags) are set, each of which indicates whether margin exchange with a processor to which a neighboring computational area is allocated has finished in terms of data of a marginal area indicated by a corresponding margin ID. If margin exchange has yet to be finished, "off" is set in the exchange processing complete flag column. The variable name of the exchange processing complete flags is "halo[hid].down".

In the block ID column, block IDs are set, which are identifiers of blocks belonging to the transmission area of a marginal area indicated by each corresponding margin ID. The variable name of the block IDs of the marginal areas is "halo [hid].id[blocknum]".

Note that, in the example of FIG. 12, information in the margin information storing unit 142 is stored in a table format, however, a different data configuration may be used. For example, a pointer is set which indicates an association of each margin ID with the block count, the processed block count, the exchange processing complete flag, and the block ID of a marginal area indicated by the margin ID. With this, it is also possible to associate these information items with each other.

With the processor module 100 having the above-described configuration, computation of physical quantities in the computational area 40 and margin exchange are performed each time the physical simulation time moves forward by one time step. At this time, the individual cores 111 to 114 of the processor 110 sequentially select blocks and compute physical quantities for each block.

Figure 13:
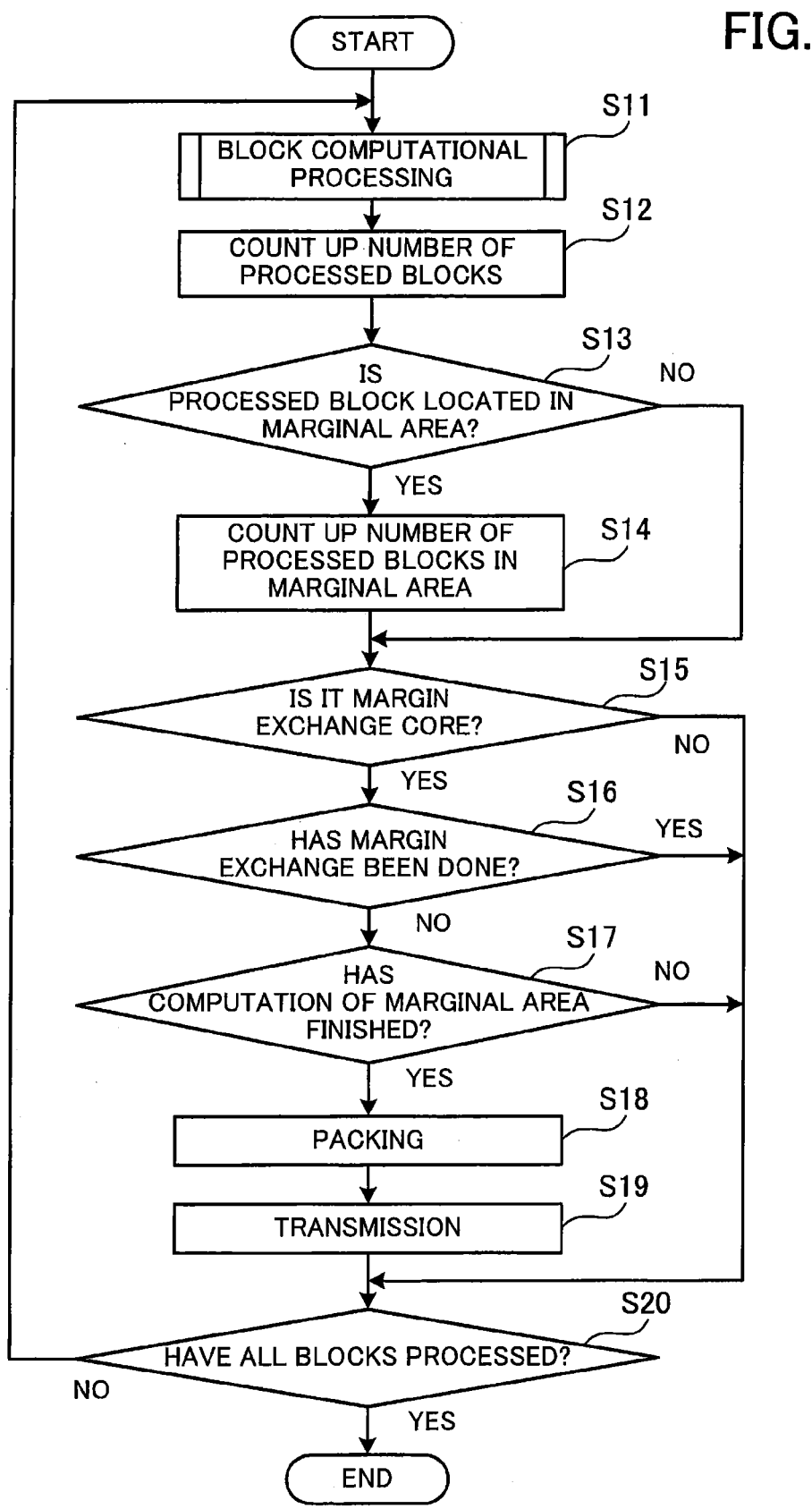
FIG. 13 is a flowchart illustrating procedures of computational processing performed by cores to obtain physical quantities in a computational area according to the second embodiment.

FIG. 13 is a flowchart illustrating procedures of computational processing performed by cores to obtain physical quantities in a computational area, according to the second embodiment. Note that, before the start of the processing, physical quantities (or initial values of physical quantities) at lattice points in the computational area 40 obtained at one time step prior to a simulation time for computation are stored in the physical quantity storing unit 144. In addition, the data in the physical quantity storing unit 144 is read into the cache memory 115. The processing of FIG. 13, which is assumed here to be executed by the thread 134, is described next according to the step numbers.

[Step S11] The computational block selecting unit 134a and the computing unit 134b cooperate to compute physical quantities of all lattice points in one block. Details of this process are described later (see FIG. 15).

[Step S12] The computing unit 134b counts up the number of processed blocks. Specifically, the computing unit 134b increments the value of the variable "calcblknum" which indicates the processed block count.

[Step S13] The computing unit 134b determines whether the processed block belongs to the transmission area of a marginal area. Specifically, the computing unit 134b refers to the margin ID (Blk[bid]) of the processed block in the block management table 141a. If the value of the referred margin ID (variable "Blk[bid]") is not "−1", the computing unit 134b determines that the processed block belongs to the transmission area of a marginal area. If the processed block belongs to the transmission area of a marginal area, the processing proceeds to Step S14. If the processed block does not belong to the transmission area of a marginal area, the processing proceeds to Step S15.

[Step S14] The computing unit 134b counts up the number of processed blocks in a marginal area to which the processed block belongs. Specifically, the computing unit 134b acquires the margin ID (Blk[bid]) of the processed block from the block management table 141a. Subsequently, the computing unit 134b searches the margin management table 142a for a margin information record in which the same margin ID (hid) as the acquired margin ID is set. Then, the computing unit 134b increments the value of the processed block count (halo[hid].calcnum) of the margin information record found in the search.

[Step S15] The computing unit 134b determines whether the core to which the computing unit 134b belongs is a margin exchange core. Specifically, the computing unit 134b determines that it is a margin exchange core when a core ID set in the margin exchange core information storing unit 143 matches the core ID of the core to which the computing unit 134b belongs. If it is a margin exchange core, the processing proceeds to Step S16. If it is not a margin exchange core, the processing proceeds to Step S20.

[Step S16] The margin exchange processing unit 134c determines whether margin exchange for all marginal areas has finished. Specifically, the margin exchange processing unit 134c refers to the exchange processing complete flag (halo[hid].down) of each margin information record in the margin management table 142a. If at least one exchange processing complete flag is "off", the margin exchange processing unit 134c determines that there is a marginal area for which margin exchange has not been done. If there is a marginal area for which margin exchange has yet to be done, the processing proceeds to Step S17. If margin exchange of all marginal areas has finished, the processing proceeds to Step S20.

[Step S17] The margin exchange processing unit 134c determines whether computation of all blocks in the transmission area of a marginal area for which margin exchange has yet to be done has finished. Specifically, the margin exchange processing unit 134c compares the block count (halo[hid].blknum) and the processed block count (halo[hid].calcnum) of a marginal area whose exchange processing complete flag is "off" in Step S16. If these two counts match each other, the margin exchange processing unit 134c determines that the computation has finished. If there is a marginal area for which computation has finished, the processing proceeds to Step S18. If there is no marginal area for which computation has finished, the processing proceeds to Step S20.

[Step S18] The margin exchange processing unit 134c packs computational results for blocks belonging to the transmission area of a marginal area for which computation has finished. Specifically, the margin exchange processing unit 134c refers to the margin management table 142a and acquires the block IDs (halo[hid].id[blocknum]) of the marginal area for which computation is determined to be finished in Step S17. Subsequently, the margin exchange processing unit 134c extracts, from the physical quantity storing unit 144, data indicating physical quantities of blocks corresponding to the acquired block IDs, and stores the extracted data in continuous memory areas in the memory 120.

[Step S19] The margin exchange processing unit 134c transmits the data packed in Step S18 to other modules having a processor, to which neighboring computational areas lying adjacent to the computational area 40 on contact with the marginal areas have been allocated. The transmitted data is unpacked by a margin exchange processing unit of each of the destination processor modules. Subsequently, the margin exchange processing unit 134c changes, to "on", the exchange processing complete flag (halo[hid].down) of a marginal area for which packing and transmission processing have been performed.

[Step S20] The computing unit 134b determines whether all blocks in the computational area have been processed. Specifically, the computing unit 134b determines that all blocks have been processed when the processed block count (calcblknum) of the processed block count information 141b has reached the number of blocks in the computational area (121 blocks in the example of FIG. 10). If processing of all blocks has been completed, the computational processing is ended. If there is an unprocessed block, the processing proceeds to Step S11.

Thus, only a core whose core ID is set in the margin exchange core information storing unit 143 performs margin exchange as a margin exchange core. That is, the margin exchange core determines whether there is a block whose margin exchange has yet to be done and for which computation of the transmission area of a marginal area has finished, and when detecting such a block, the margin exchange core starts margin exchange processing. The margin exchange core stops computational processing which has been performed to this point, and starts the margin exchange processing, which is not performed by other cores. On the other hand, cores other than the margin exchange core do not perform Steps S16 to S19, and repeats computation of physical quantities at lattice points in each block.

In the margin exchange processing, packing of data and transmission processing of the packed data are performed first. In a destination processor module, processes of receiving the data and unpacking of the received data are performed. When a series of the margin exchange processing is finished, the margin exchange core performs the margin exchange processing in a similar manner if there is another marginal area for which computation has finished but margin exchange has yet to be done. On the other hand, if there is no marginal area ready for margin exchange, the margin exchange core returns to the computational processing which is the same processing performed by other computation-dedicated cores.

Next described is the order of blocks to be selected as computing targets.

Figure 14:
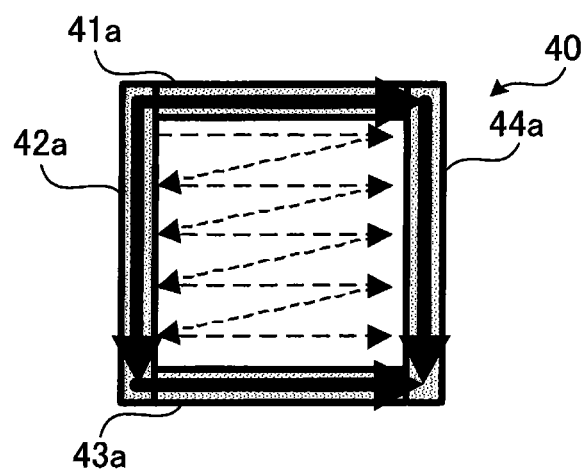
FIG. 14 illustrates a priority order of block selection.

FIG. 14 illustrates a priority order of block selection. According to the second embodiment, a priority order for selecting blocks in the computational area 40 is set. Blocks belonging to the transmission areas of the marginal areas have higher priority, and the remaining blocks have lower priority. The computational block selecting unit 134a preferentially selects blocks in areas having higher priority and causes the computing unit 134b to perform computation.

Figure 15:
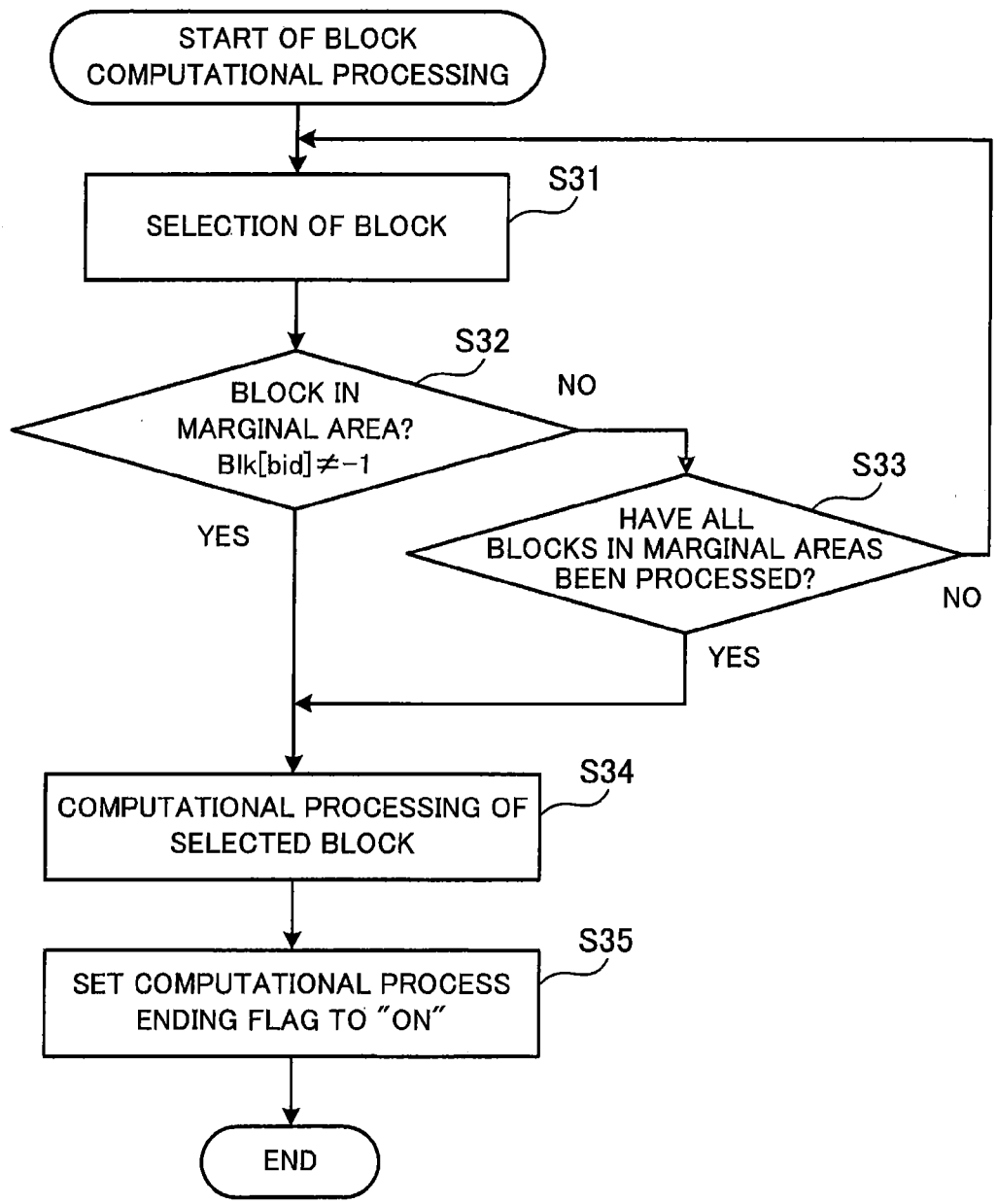
FIG. 15 is a flowchart illustrating procedures of block computational processing.

FIG. 15 is a flowchart illustrating procedures of block computational processing. The following describes the processing of FIG. 15 according to the step numbers.

[Step S31] The computational block selecting unit 134a selects one unprocessed block in the computational area 40. Specifically, the computational block selecting unit 134a refers to the block management table 141a and selects one block whose computational process ending flag (down[bid]) is "off". For example, the computational block selecting unit 134a sequentially selects blocks in the order of smaller block ID values. After the number of block IDs of selection targets has reached the number of blocks in the computational area 40, the computational block selecting 134a sequentially selects unprocessed blocks in the order of smaller block IDs again if there are yet unprocessed blocks.

[Step S32] The computational block selecting unit 134a determines whether the selected block belongs to the transmission area of a marginal area. Specifically, the computational block selecting unit 134a refers to the margin ID (Blk [bid]) of the selected block, and determines that the block belongs to a marginal area if the value of the margin ID is not "−1". If the block belongs to a marginal area, the processing proceeds to Step S34. If the block does not belong to a marginal area, the processing proceeds to Step S33.

[Step S33] The computational block selecting unit 134a determines whether all blocks belonging to the transmission areas in the marginal areas have been processed. Specifically, the computational block selecting unit 134a refers to the margin management table 142a. Then, the computational block selecting unit 134a determines that all the blocks have been processed in the case where, for all marginal areas, the block counts (halo[hid].blknum) match the corresponding processed block counts (halo[hid].calcnum). In the case where all blocks belonging to the transmission areas in the marginal areas have been processed, the processing proceeds to Step S34. If there is an unprocessed block belonging to the transmission areas in the marginal areas, the processing proceeds to Step S31.

[Step S34] The computing unit 134b computes physical quantities at lattice points in the block selected in Step S31. For example, the computing unit 134b acquires, from the physical quantity storing unit 144, physical quantities at lattice points and the surrounding area obtained at one pervious time step in the simulation time. Then, the computing unit 134b calculates physical quantities of the lattice points at the current simulation time based on the acquired physical quantities. Further, the computing unit 134b writes the calculated physical quantities in the physical quantity storing unit 144.

[Step S35] The computing unit 134b sets the computational process ending flag (down[bid]) of the computed block to "on". Subsequently, the block computational processing is completed.

As described above, computation of blocks belonging to the transmission areas of the marginal areas is preferentially performed, and only a single core performs the margin exchange processing. With this, it is possible to prevent the multiple cores 111 to 114 from simultaneously performing the margin exchange processing in parallel. As a result, accesses of multiple cores to the memory 120 for margin exchange do not occur at the same time, which prevents a decrease in process efficiency due to waiting for the bus between the processor 110 and the memory 120 to be available.

Next described is a difference in the processing time between when multiple cores perform margin exchange processing at the same time after finishing computation of physical quantities for all blocks in the computational area and when processing is performed according to the procedures of the second embodiment.

Figure 16:
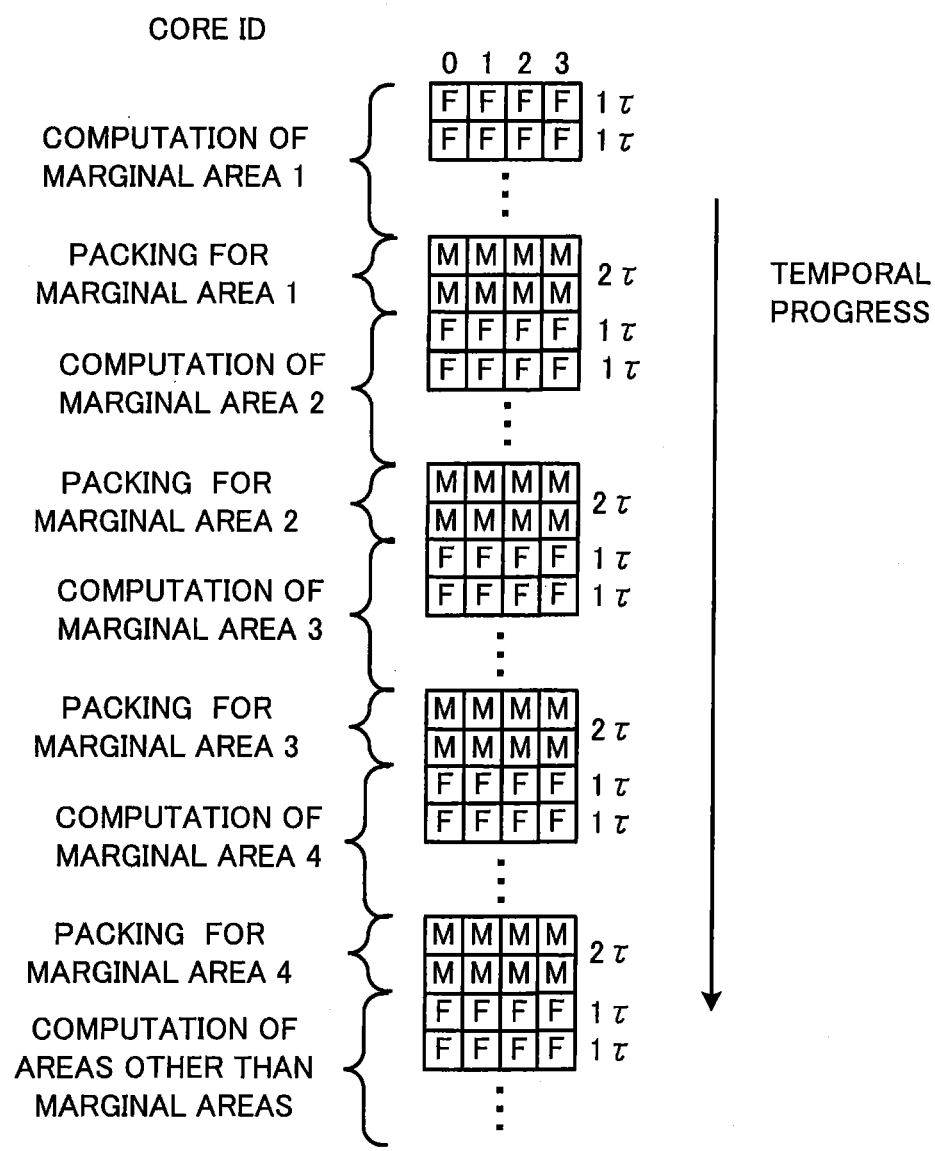
FIG. 16 illustrates a transition of processing contents of multiple cores observed in the case where the cores perform margin exchange processing at the same time after finishing computation of physical quantities for all blocks in the computational area.

FIG. 16 illustrates a transition of processing contents of multiple cores observed in the case where the cores perform margin exchange processing at the same time after finishing computation of physical quantities for all blocks in the computational area. Assume that, in the example of FIG. 16, a memory bus is provided which has a bus width allowing up to two cores to perform memory accesses at the same time (memory bus width is 2). In addition, assume that the computational processing time of a core per block is 1τ.

Assume here that, if no competition for memory access occurs, the time required for four cores to perform memory accesses associated with packing processing is 1τ. In practice, competition for memory access occurs if four cores perform memory accesses at the same time, and a time of 2τ is required for each core to perform memory access associated with packing processing. In FIG. 16, each core is indicated by a core ID, and the process content of each core is indicated by a symbol "F" or "M" under the core ID. The symbol "F" indicates computational processing, and the symbol "M" indicates a memory access (the same applies to FIGS. 17 and 21).

Here, if four margin exchange processes are performed at the same time after computation of physical quantities for all blocks in the computational area is finished, the individual cores 111 to 114 access the memory 120 at the same time. Then, competition for memory access occurs, which leads to a reduction in process efficiencies of the individual cores. According to the example of FIG. 16, each core requires 2τ for packing data of a marginal area, which should be essentially finished in 1τ. As a result, the amount of time that the four cores spend for the packing processing is 8τ. The total amount of time obtained by multiplying the number of cores for performing the packing processing by the processing time is 32τ.

Figure 17:
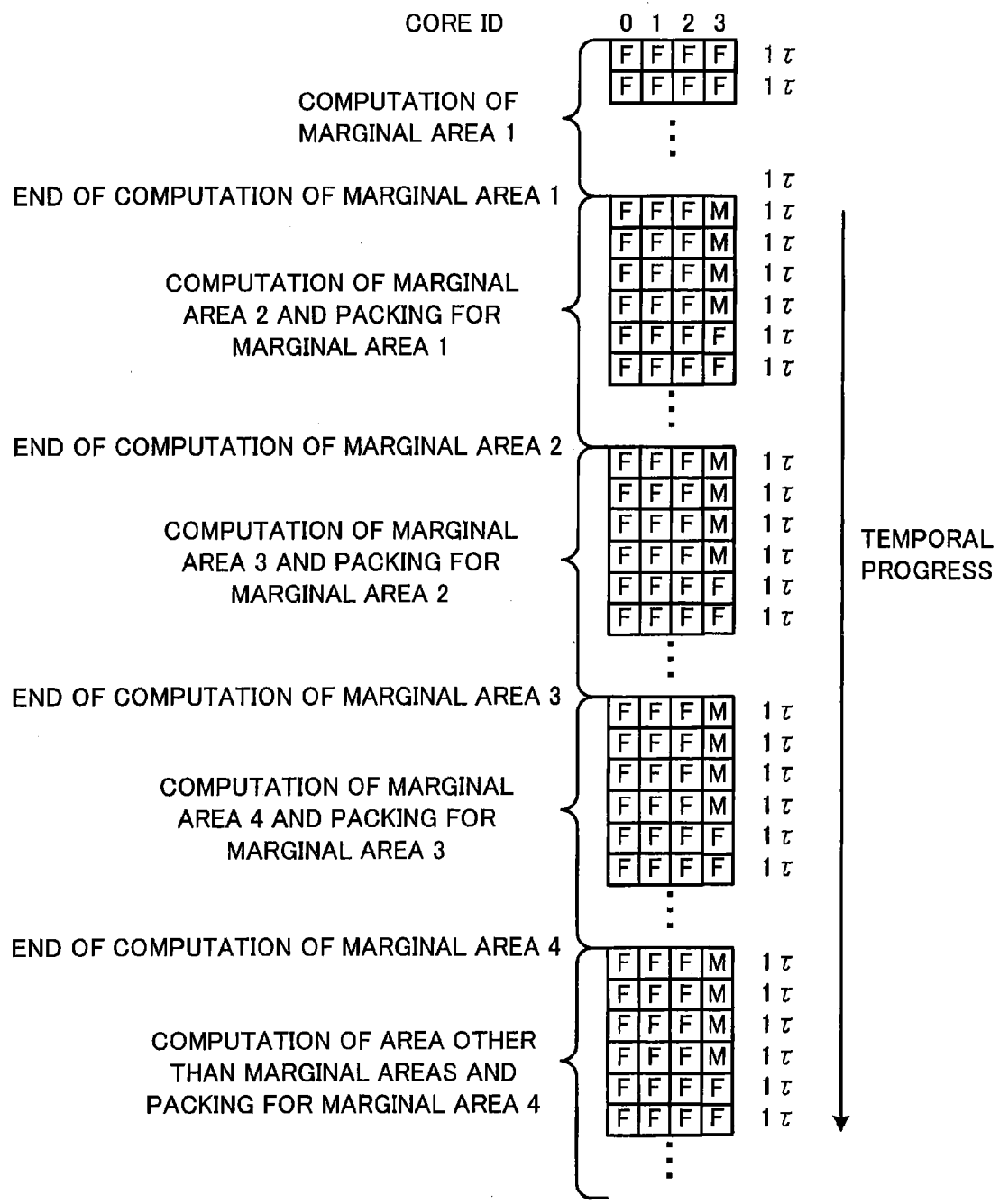
FIG. 17 illustrates a transition of processing contents of individual cores according to the second embodiment.

FIG. 17 illustrates a transition of processing contents of individual cores according to the second embodiment. In the example of FIG. 17, physical quantities for individual blocks are computed in the order of: the transmission area 41a of the marginal area 41; the transmission area 42a of the marginal area 42; the transmission area 43a of the marginal area 43; the transmission area 44a of the marginal area 44; and areas other than the marginal areas. In this case, once the computation for individual blocks in the transmission area 41a of the marginal area 41 is finished, the core 114 having the core ID "3" packs data of the transmission area 41a in the marginal area 41. During this period of time, the remaining cores 111 to 113 perform computation for blocks in the transmission area 42a of the marginal area 42.

While the core 114 is performing the packing processing, other cores 111 to 113 do not make access to the memory 120. Therefore, the core 114 is able to finish the packing processing in 4τ. After finishing the packing processing, the core 114 performs computation for blocks in the transmission area 42a of the marginal area 42.

After that, in a similar fashion, each time computation of physical quantities for blocks in the transmission areas 42a, 43a, and 44a of the individual marginal areas 42 to 44 is finished, the packing processing is performed by the core 114 for 1τ. Then, after packing for all the transmission areas 41*a*, 42*a*, 43*a*, and 44*a* is finished, computation of physical quantities for blocks in areas other than the marginal areas 41 to 44 is performed.

As a result, the total amount of time spent on the packing processing by the core is 16τ. If the total amount of time is compared to the result illustrated in FIG. 16, it can be observed that the time spent on the packing processing is shortened by half. Furthermore, since computation for the marginal areas is preferentially performed, the packing processing is finished at the time when computation for the whole area is finished, which enables a quick transition to computation in the next time step.

That is, when processing is performed by multiple cores and then data packing is performed, memory accesses occur. If the memory accesses are performed by multiple cores at the same time, process efficiency cannot be improved. In view of this problem, the second embodiment is configured in such a manner that one specific core performs the data packing processing and other cores perform the normal computational processing.

That is, the data packing processing which is an overhead of the parallel processing involves a process causing memory accesses after data is removed from the secondary cache memories, which prevents an improvement in usage efficiency of the processors even if thread parallel processing using multiple cores is performed. For this process, instead of all the cores accessing the memory at the same time to place a heavy burden on the memory bus, only a specific core performs the data packing and unpacking process. With this, the memory access is equalized, which enables an improvement in usage efficiency of the multiple cores.

In addition, according to the second embodiment, when the computational processing for the margin exchange areas is finished, the specific core starts the data packing processing without waiting for the end of the computational processing of areas other than the margin exchange areas. That is, the specific core sequentially performs data packing and communication processing of the marginal areas, starting with a marginal area for which computation of the transmission area is finished. During that time, cores except for the specific core perform normal computational processing. With this, it is possible to perform the margin exchange processing in parallel with the computation of physical quantities for blocks, which improves process efficiency.

Further, according to the second embodiment, the whole space is divided into blocks, and blocks in the individual marginal areas are sectioned from blocks in areas other than the marginal areas. Then, whether the computational processing of the marginal space is finished is determined by counting the number of processed blocks in the marginal space. Subsequently, in the case where the computation for the marginal space is finished, the margin exchange core stops the computational processing and starts the data packing and communication processing for margin exchange. Then, when the communication processing is finished, the margin exchange core resumes the normal computational processing. Thus, when the margin exchange processing for one marginal area is finished, the core which finished performing the margin exchange immediately returns to the computation of physical quantities for blocks. With this, it is possible to improve process efficiencies of the processors.

Third Embodiment

Next described is a third embodiment. The third embodiment enables distribution of concentration of memory access by not limiting a core for performing the packing process to a specific core. Note that the hardware configuration of a computer system according to the third embodiment is the same as that of the computer system of FIGS. 7 and 8 according to the second embodiment.

Figure 18:
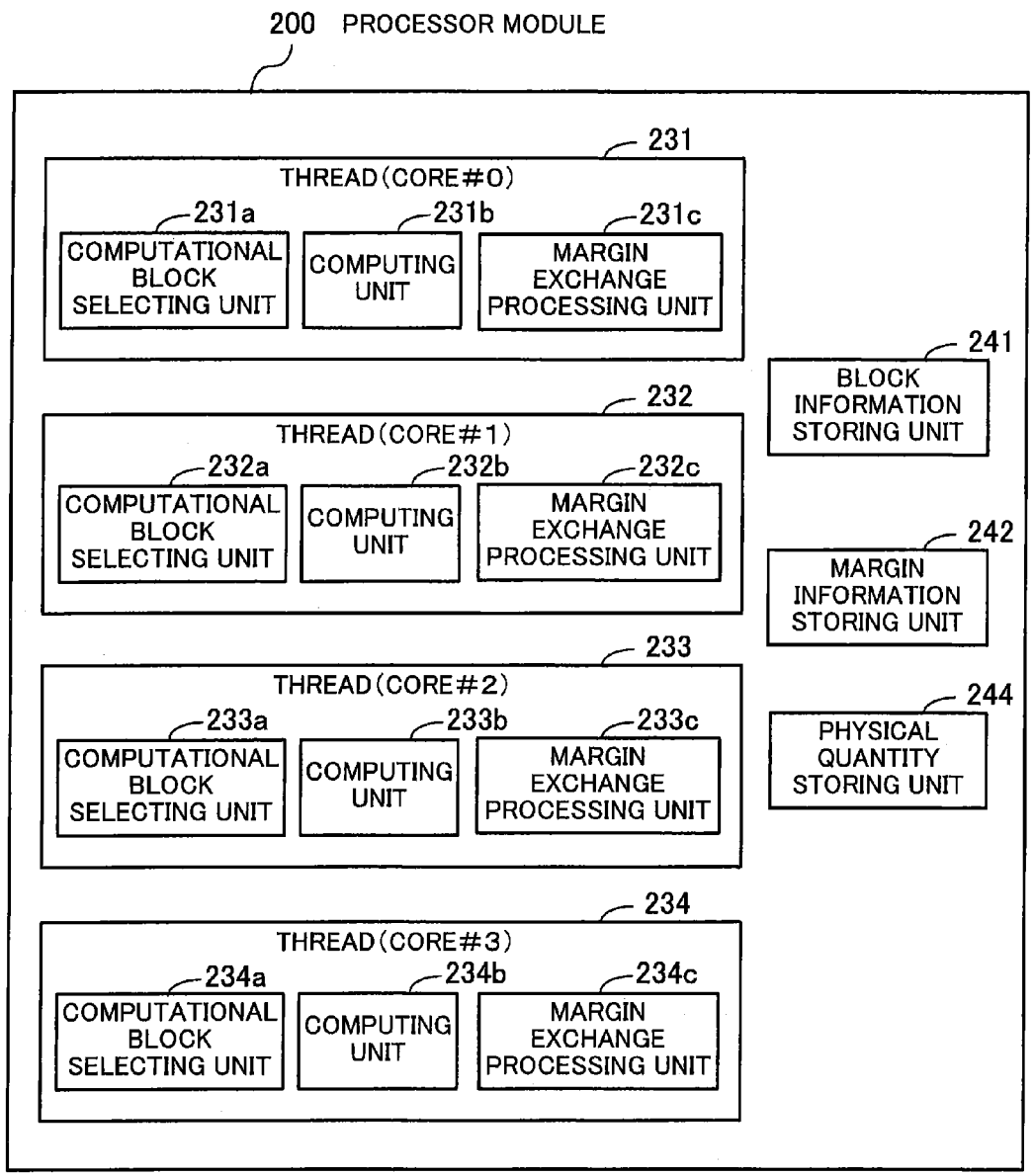
FIG. 18 illustrates processing functions in a processor module at the time of a physical simulation according to a third embodiment.

FIG. 18 illustrates processing functions in a processor module at the time of a physical simulation according to the third embodiment. According to the third embodiment, multiple processor modules having the same functions as those of a processor module 200 of FIG. 18 are provided in the computer 10 in place of the processor modules 100, 100*a*, . . . of FIGS. 7 and 8.

In the processor module 200, threads 231 to 234 corresponding to individual cores are generated. The thread 231 includes a computational block selecting unit 231*a*, a computing unit 231*b*, and a margin exchange processing unit 231*c*. The computational block selecting unit 231*a* sequentially selects, from a computational area allocated to the processor module 200, blocks for which computation is performed by the thread 231. The computing unit 231*b* computes physical quantities of each block selected by the computational block selecting unit 231*a*. The margin exchange processing unit 231*c* performs margin exchange with other processing modules.

As in the case of the thread 231, the remaining threads 232, 233, and 234 include computational block selecting units 232*a*, 233*a*, and 234*a*, computing units 232*b*, 233*b*, and 234*b*, and margin exchange processing units 232*c*, 233*c*, and 234*c*, respectively. Thus, unlike in the case of the second embodiment, all the threads 231 to 234 include the margin exchange processing units 232*c*, 233*c*, 234*c*, respectively, according to the third embodiment.

In addition, the processor module 200 also includes, as information storage functions, a block information storing unit 241, a margin information storing unit 242, and a physical quantity storing unit 244. Information stored in the block information storing unit 241 and information stored in the physical quantity storing unit 244 are the same as that of the block information storing unit 141 and that of the physical quantity storing unit 144, respectively, illustrated in FIG. 9 according to the first embodiment. That is, in the block information storing unit 241, the block management table 141*a* and the processed block count information 141*b* of FIG. 11 are stored. In addition, compared to the second embodiment illustrated in FIG. 9, the third embodiment does not require the margin exchange core information storing unit 143.

The margin information storing unit 242 is a memory area for storing information indicating a condition of each marginal area. For example, a part of the memory area of the cache memory 115 or the memory 120 is used as the margin information storing unit 242.

FIG. 19 illustrates an example of a data configuration of a margin information storing unit according to the third embodiment. The margin information storing unit 242 includes a margin management table 242*a*. The margin management table 242*a* includes columns for margin ID, block count, processed block count, exchange processing complete flag, block ID, and last computational block ID. Information items in each row of the margin management table 242*a* are associated with each other, and form one record indicating margin information. Note that margin information records as many as the number of margins are registered in the margin management table 242*a*. Information set in each of the individual columns for the margin ID, block count, processed block count, exchange processing complete flag, and block ID is the same kind as the information set in a corresponding column having the same name in the margin management table 142a of FIG. 12.

In the last computational block ID column, identifiers (last computational block IDs) of blocks which were computed last in the individual marginal areas are set. Each last computational block ID is set by a core which performs computation of the last computational block in the transmission area of a corresponding marginal area when computation for all blocks in the transmission area of the marginal area is finished. The variable name of the last computational block IDs is "halo[hid].lastblock".

Next described are procedures of the physical quantity computational processing for the computational area performed by individual cores according to the third embodiment.

Figure 20:
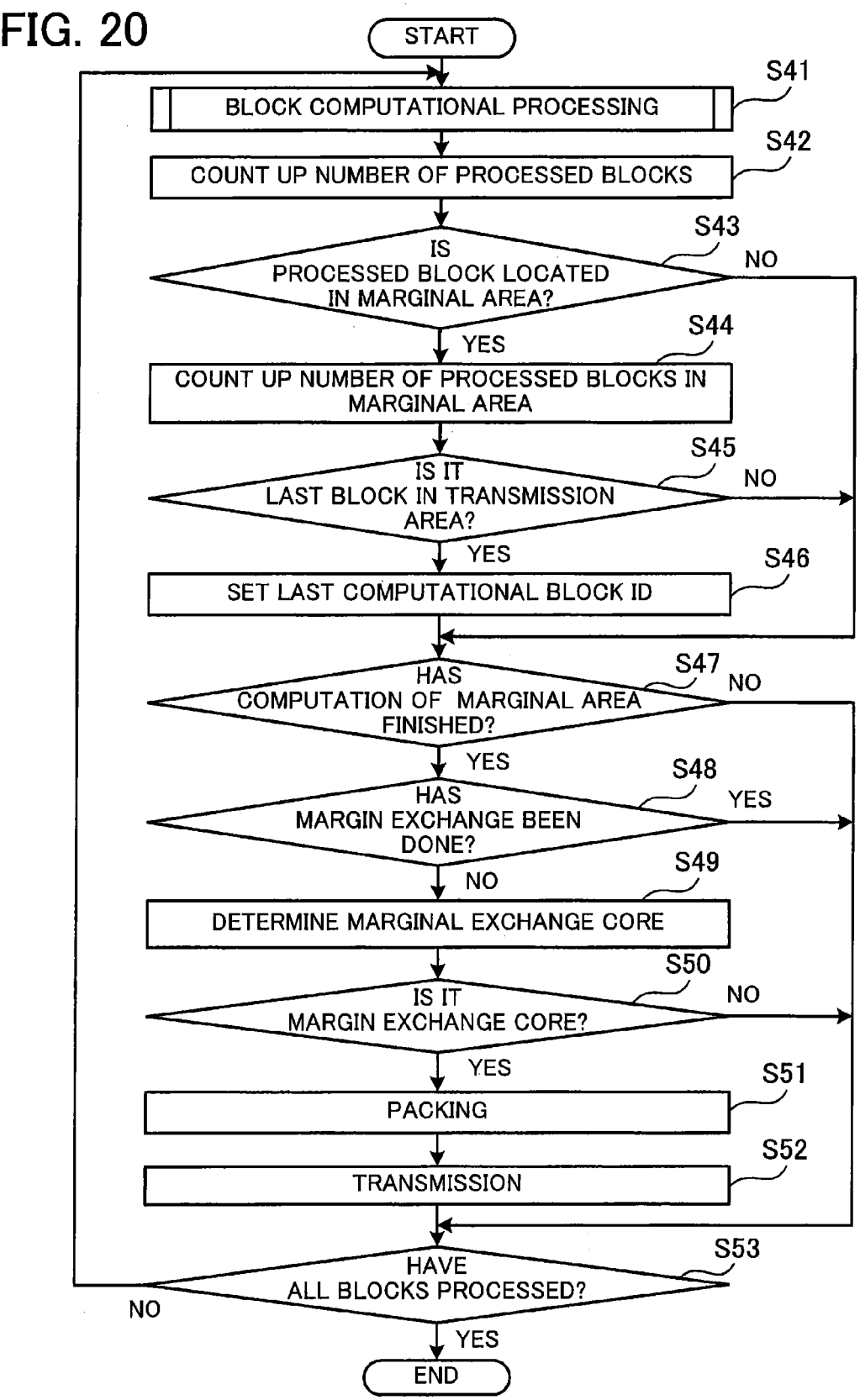
FIG. 20 is a flowchart illustrating procedures of physical quantity computational processing for the computational area performed by cores according to the third embodiment.

FIG. 20 is a flowchart illustrating procedures of physical quantity computational processing for the computational area performed by cores according to the third embodiment. The processing of FIG. 20, which is performed by a core which executes the thread 231, is described next according to the step numbers.

[Step S41] The computational block selecting unit 231a and the computing unit 231b cooperate to compute physical quantities at all lattice points in one block. Details of this process are the same as the block computational processing of FIG. 15 according to the second embodiment.

[Step S42] The computing unit 231b counts up the number of processed blocks. Specifically, the computing unit 231b increments the value of the variable "calcblknum" which indicates the processed block count.

[Step S43] The computing unit 231b determines whether the processed block belongs to the transmission area of a marginal area. Specifically, the computing unit 231b refers to the margin ID (Blk[bid]) of the processed block in the block management table 141a of the block information storing unit 241. If the value of the referred margin ID (variable "blk[bid]") is not "−1", the computing unit 231b determines that the processed block belongs to the transmission area of a marginal area. If the processed block belongs to the transmission area of a marginal area, the processing proceeds to Step S44. If the processed block does not belong to the transmission area of a marginal area, the processing proceeds to Step S47.

[Step S44] The computing unit 231b counts up the number of processed blocks in a marginal area to which the processed block belongs. Specifically, the computing unit 231b acquires the margin ID (Blk[bid]) of the processed block from the block management table. Subsequently, the computing unit 231b searches the margin management table 242a for a margin information record in which the same margin ID (hid) as the acquired margin ID is set. Then, the computing unit 231b increments the value of the processed block count (halo[hid].calcnum) of the margin information record found in the search.

[Step S45] The computing unit 231 determines whether the block for which computation is performed in Step S41 is the last block in the transmission area of a marginal area. Specifically, the computing unit 231 determines that the block for which computation is performed in Step S41 is the last block when the processed block count (halo[hid].calcnum) after the count-up process of Step S44 has reached the same number as the block count (halo[hid].blknum) of a corresponding marginal area. If the block is the last block in the transmission area, the processing proceeds to Step S46. If the block is not the last block in the transmission area, the processing proceeds to Step S47.

[Step S46] The computing unit 231b sets, in the margin management table 242a, the block ID of the block for which computation is performed in Step S41 as the last computational block ID (halo[hid].lastblock).

[Step S47] The margin exchange processing unit 231c determines whether there is a marginal area in which computation of all blocks in the transmission area has finished. Specifically, the margin exchange processing unit 231c compares, with respect to each of the marginal areas, the block count (halo[hid].blknum) and the corresponding processed block count (halo[hid].calcnum). If there is a marginal area for which these two counts match each other, the margin exchange processing unit 231c determines that computation for all blocks in the transmission area of the marginal area has finished. If there is a marginal area for which the computation has finished, the processing proceeds to Step S48. If there is no marginal area for which the computation has finished, the processing proceeds to Step S53.

[Step S48] The margin exchange processing unit 231c determines whether margin exchange of the marginal area for which computation is finished has been done. Specifically, the margin exchange processing unit 231c refers, in the margin management table 242a, to the exchange processing complete flag (halo[hid].down) of the margin information record for the marginal area for which computation is finished. If the corresponding exchange processing complete flag is "off", the margin exchange processing unit 231c determines that margin exchange has yet to be done. If there is a marginal area for which margin exchange has yet to be done, the processing proceeds to Step S49. If margin exchange of all marginal areas for which computation is finished has been done, the processing proceeds to Step S53.

[Step S49] The margin exchange processing unit 231c determines, using a predetermined algorithm, a margin exchange core for performing margin exchange of the marginal area for which computation has been finished. For example, a margin exchange core may be determined according to the remainder obtained by dividing the block ID (last computational block ID) of the last computed block by the number of cores.

Specifically, the margin exchange processing unit 231c divides the last computational block ID (halo[hid].lastblock) by the number of cores (total CoreNum) to obtain the remainder (mod(halo[hid].lastblock, totalCoreNum)). The margin exchange processing unit 231c determines that a core ID having a value equal to the obtained remainder is the margin exchange core ID (halo[hid].Packcore) for the corresponding marginal area.

[Step S50] The marginal exchange processing unit 231c determines whether the margin exchange core determined in Step S49 is the core to which the marginal exchange processing unit 231c belongs. Specifically, the margin exchange processing unit 231c determines whether the value of the remainder calculated in Step S49 matches the core ID (core #0) of the core which implements the margin exchange processing unit 231c. If these two match each other, the marginal exchange processing unit 231c determines that the core to which the marginal exchange processing unit 231c belongs is a margin exchange core. In the case where the core to which the marginal exchange processing unit 231c belongs is a margin exchange core, the processing proceeds to Step S51. In the case where the core to which the marginal exchange processing unit 231c belongs is not a margin exchange core, the processing proceeds to Step S53.

[Step S51] The margin exchange processing unit 231c packs computational results for blocks belonging to the transmission area of a marginal area for which computation has finished. Specifically, the margin exchange processing unit 231c refers to the margin management table 242a and acquires the block IDs (halo[hid].id[blocknum]) of the blocks belonging to the marginal area which has been allocated to the core determined as a margin exchange core in Step S50. Subsequently, the margin exchange processing unit 231c extracts, from the physical quantity storing unit 244, data indicating physical quantities of blocks corresponding to the acquired block IDs, and stores the extracted data in continuous memory areas in the memory 120.

[Step S52] The margin exchange processing unit 231c transmits the data packed in Step S51 to other modules having a processor, to which neighboring computational areas laying adjacent to the computational area 40 on contact with the marginal areas have been allocated. The transmitted data is unpacked by a margin exchange processing unit of each of the destination processor modules. Subsequently, the margin exchange processing unit 231c changes, to "on", the exchange processing complete flag (halo[hid].down) of a marginal area for which packing and transmission processing have been performed.

[Step S53] The computing unit 231b determines whether all blocks in the computational area have been processed. Specifically, the computing unit 231b determines that all blocks have been processed when the processed block count (calcblknum) of the processed block count information 141b has reached the number of blocks in the computational area. If processing of all blocks has been completed, the computational processing is ended. If there is an unprocessed block, the processing proceeds to Step S41.

As described above, according to the third embodiment, the margin exchange core is determined according to the remainder obtained by dividing the block ID of the last computed block in the transmission area of a marginal area by the number of cores. With this, it is possible to distribute the packing processing for margin exchange almost evenly across the individual cores. In addition, cores which do not perform margin exchange continue computational processing.

Figure 21:
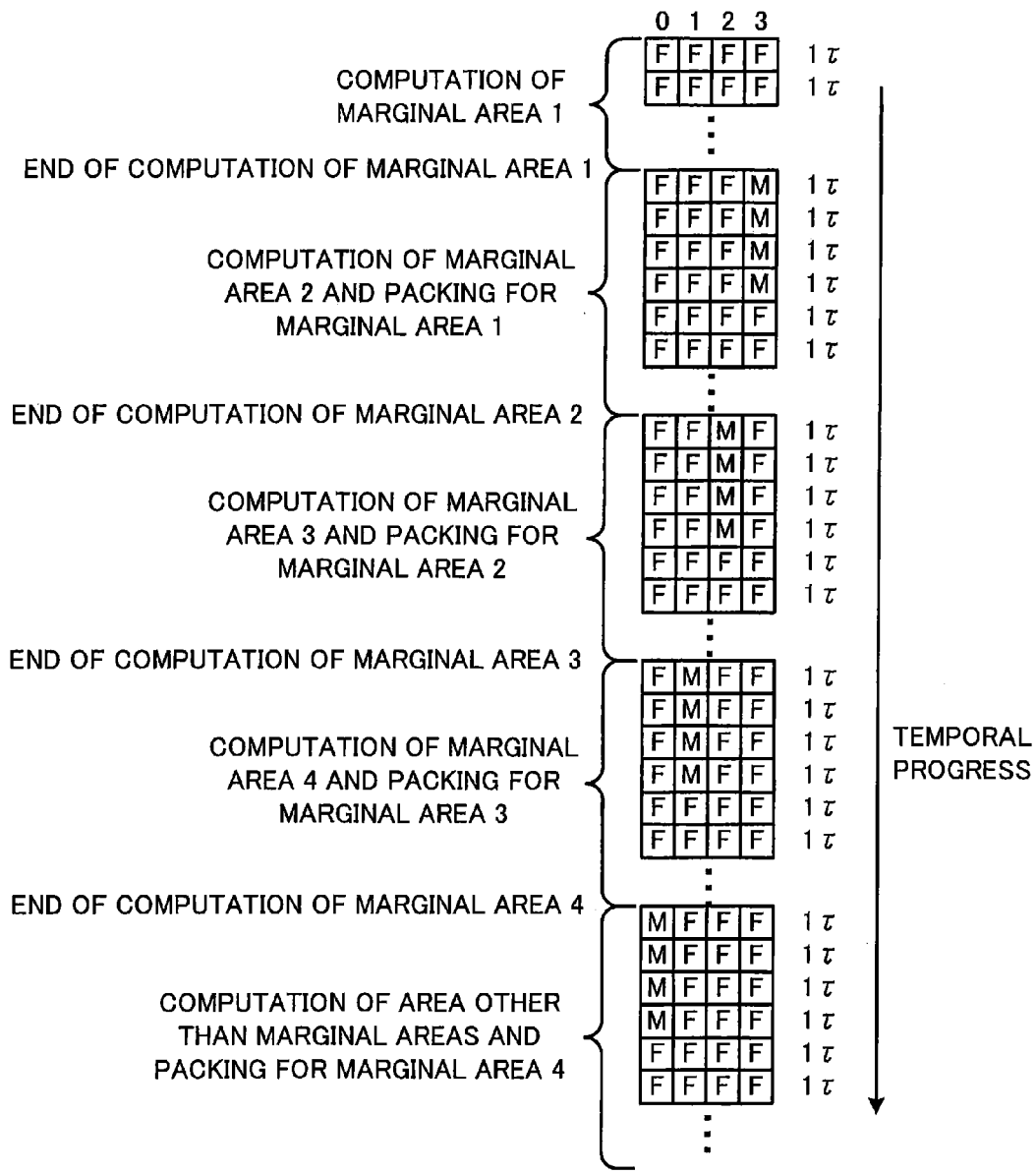
FIG. 21 illustrates a transition of processing contents of individual cores according to the third embodiment.

FIG. 21 illustrates a transition of processing contents of individual cores according to the third embodiment. Compared to the processing of FIG. 17 according to the second embodiment, the processing of FIG. 21 according to the third embodiment differs in that a core for performing data packing is not fixed. That is, the margin exchange core is determined according to the block ID of a lastly computed block among blocks belonging to the transmission area of each marginal area. Accordingly, each of the cores 111 to 114 has an equal probability of being a margin exchange core. That is, performance of the packing process is not fixed to a specific core, and it is possible to almost evenly cause all the cores to perform the packing process.

In addition, according to the third embodiment, computation of physical quantities at lattice points is sequentially performed in order, from the marginal area 41. With this, there are time lags among the ends of the computation for blocks belonging to the transmission area of each of the marginal areas 41 to 44. In this manner, it is possible to prevent simultaneous occurrence of multiple data packing processes.

Note that in the case where computation for the transmission area of one marginal area finishes during the data packing process of another marginal area, the data packing process of the newly computed marginal area may be put off until the current data packing process finishes. For example, whether data packing is being processed or not is stored in a cache memory as status information of each core. Each core advances the processing to Step S53 without performing Steps S51 and S52 when another core is performing data packing even if the answer to Step S50 is YES. In this case, when the block computational processing by the margin exchange core is finished after the data packing of another core is done, the processing proceeds to Steps S51 and 52 to perform margin exchange. With this, it is possible to prevent, in a reliable manner, occurrence of data packing processes by multiple cores at an overlapped period of time.

Other Applications

Note that in the hardware configuration illustrated in FIG. 8, one processor is mounted on a single processor module, however, multiple processors may be mounted on the single processor module. In this case, a computational area is allocated to each processor of the single processor module, and each processor computes physical quantities at lattice points in a computational area. Subsequently, margin exchange is performed among the processors in a single processor module, as well as among processors of different processor modules. Also by performing the margin exchange processing among multiple processors in the single processor module according to the procedures described above in the first to third embodiments, it is possible to reduce overlapped memory accesses by multiple cores and, thus, improve process efficiency.

In addition, the above-described processing functions may be achieved by a computer. In this case, a program is provided in which processing contents of functions that the computer needs to have are described. By executing the program on the computer, the above-described processing functions are achieved on the computer. The program in which processing contents are described may be stored in a computer-readable recording medium. Such computer-readable recording media include a magnetic-storage device, an optical disk, a magneto-optical medium, and a semiconductor memory. Examples of the magnetic-storage device are a hard disk drive (HDD), a flexible disk (FD), and a magnetic tape. Example of the optical disk are a digital versatile disk (DVD), a digital versatile disk random access memory (DVD-RAM), a compact disc read-only memory (CD-ROM), and a CD rewritable (CD-RW). An example of the magneto-optical medium is a magneto-optical disc (MO).

In the case of distributing the program, portable recording media, such as DVDs and CD-ROMs, in which the program is stored are sold. In addition, the program may be stored in a memory device of a server computer and then transferred from the server computer to another computer via a network.

A computer for executing the program stores the program, which is originally stored in a portable recording medium or transferred from the server computer, in its own memory device. Subsequently, the computer reads the program from its own memory device and performs processing according to the program. Note that the computer is able to read the program directly from the portable recording medium and perform processing according to the program. In addition, the computer is able to perform processing according to sequentially received programs each time the programs are transferred from the server computer.

In addition, at least part of the above-described processing functions may be achieved by an electronic circuit, such as a digital signal processor (DSP), an application specific integrated circuit (ASIC), and a programmable logic device (PLD).

According to the above-described parallel computing apparatus, it is possible to prevent accesses to a main memory device caused by multiple cores simultaneously transmitting computational results of multiple computational result transmission areas, to thereby improve process efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A parallel computing apparatus comprising:
a first processor configured to execute parallel computation of a physical simulation, a multidimensional analytical space of the physical simulation being divided into simulation areas, the first processor being configured to compute physical quantities of a simulation area of the simulation areas, the simulation area being divided into a plurality of blocks, at least part of the blocks in the simulation area being grouped into marginal areas,
wherein the first processor includes a plurality of cores, and each of the plurality of cores
selects uncomputed blocks from the blocks in the simulation area, sequentially,
computes values of the physical quantities for the selected blocks, and
writes the values of the physical quantities in a memory that is accessible from each of the plurality of cores, and
at least one of the plurality of cores performs computational result acquisition and transmission processing in a different time period with respect to each of the marginal areas, the computational result acquisition processing being for acquiring values of the physical quantities of the at least part of the blocks included in the marginal areas from the memory, the computational result transmission processing being for transmitting the acquired values of the physical quantities to a second processor.

2. The parallel computing apparatus according to claim 1, wherein
only one of the plurality of cores performs the computational result acquisition and transmission processing.

3. The parallel computing apparatus according to claim 1, wherein
when each of the plurality of cores selects the uncomputed blocks from the blocks in the simulation area, priority is placed on the at least part of the plurality of blocks included in each of the marginal areas.

4. The parallel computing apparatus according to claim 1, wherein
the at least one of the plurality of cores performs the computational result acquisition and transmission processing in an order from a marginal area in which the computation has been finished for all of the at least part of the blocks included in the marginal area.

5. The parallel computing apparatus according to claim 1, wherein
when the at least one of the plurality of cores detects a marginal area in which the computation has been finished for all of the at least part of the blocks included in the marginal area, the at least one of the plurality of cores stops performing the computation, acquires the computational result for the detected marginal area, and transmits the acquired computational result.

6. The parallel computing apparatus according to claim 5, wherein
when the at least one of the plurality of cores completes acquiring the computational results and transmitting the acquired computational results for the detected marginal area, the at least one of the cores resumes the computation.

7. The parallel computing apparatus according to claim 1, wherein
any of the plurality of cores is able to perform the computational result acquisition and transmission processing, and each of the cores determines whether to perform the computational result acquisition and transmission processing by using a predetermined algorithm, and performs the computational result acquisition and transmission processing when determining affirmatively.

8. The parallel computing apparatus according to claim 1, wherein
each of the plurality of cores divides, by a number of cores, an identification number of a block for which the computation is performed last in one of the marginal areas to which the block belongs, and performs the computational result acquisition and transmission processing in a case where a remainder of the division coincides with an identification number assigned to the core.

9. A parallel computing method executed by a first processor for parallel computation of a physical simulation, a multidimensional analytical space of the physical simulation being divided into simulation areas, the first processor being configured to compute physical quantities of a simulation area of the simulation areas, the simulation area being divided into a plurality of blocks, at least part of the blocks in the simulation area being grouped into marginal areas, the parallel computing method comprising:
selecting uncomputed blocks from the blocks in the simulation area by each of a plurality of cores included in the first processor, sequentially;
computing values of the physical quantities for the selected blocks by each of the plurality of cores included in the first processor; and
writing the values of the physical quantities by each of the plurality of cores included in the first processor in a memory that is accessible from each of the plurality of cores; and
performing computational result acquisition and transmission processing in a different time period with respect to each of the marginal areas by at least one of the plurality of cores, the computational result acquisition processing being for acquiring values of the physical quantities of the at least part of the blocks included in the marginal areas from the memory, the computational result transmission processing being for transmitting the acquired values of the physical quantities to a second processor.

10. A computer-readable, non-transitory medium storing a computer program for directing each of a plurality of cores included in a first processor to perform a process of a physical simulation, a multidimensional analytical space of the physical simulation being divided into simulation areas, the first processor being configured to compute physical quantities of a simulation area of the simulation areas, the simulation area being divided into a plurality of blocks, at least part of the blocks in the simulation area being grouped into marginal areas, the process comprising:
selecting uncomputed blocks from the blocks in the simulation area, sequentially;
computing values of the physical quantities for the selected blocks;

writing the values of the physical quantities in a memory which is accessible from each of the plurality of cores;

performing computational result acquisition and transmission processing in a different time period with respect to each of the marginal areas by at least one of the plurality of cores, the computational result acquisition processing being for acquiring values of the physical quantities of the at least part of the blocks included in the marginal areas from the memory, the computational result transmission processing being for transmitting the acquired values of the physical quantities to a second processor.

* * * * *